US 6,526,351 B2

(12) United States Patent
Whitham

(10) Patent No.: US 6,526,351 B2
(45) Date of Patent: Feb. 25, 2003

(54) INTERACTIVE MULTIMEDIA TOUR GUIDE

(76) Inventor: Charles Lamont Whitham, 11507 Purple Beech Dr., Reston, VA (US) 20191

( * ) Notice: Subject to any disclaimer, the term of this patent is extended or adjusted under 35 U.S.C. 154(b) by 0 days.

(21) Appl. No.: 09/900,161

(22) Filed: Jul. 9, 2001

(65) Prior Publication Data

US 2003/0009281 A1 Jan. 9, 2003

(51) Int. Cl.[7] .............................................. G01C 21/00
(52) U.S. Cl. ...................... 701/211; 701/213; 701/201; 701/207; 701/208
(58) Field of Search ................................. 701/201, 207, 701/208, 209, 211, 212, 213; 340/988, 989, 990, 995

(56) References Cited

U.S. PATENT DOCUMENTS

| 5,767,795 | A |   | 6/1998  | Schaphorst ............... 340/988 |
|-----------|---|---|---------|-----------------------------------|
| 5,802,492 | A | * | 9/1998  | DeLorme et al. ........... 701/201 |
| 5,924,075 | A |   | 7/1999  | Kanemitsu ..................... 705/6 |
| 5,948,040 | A |   | 9/1999  | DeLorme et al. ........... 701/201 |
| 5,964,821 | A |   | 10/1999 | Brunts et al. ............... 701/201 |
| 6,009,403 | A |   | 12/1999 | Sato ............................... 705/6 |
| 6,055,478 | A |   | 4/2000  | Heron ......................... 701/213 |
| 6,085,148 | A |   | 7/2000  | Jamison et al. ............. 701/211 |
| 6,148,261 | A | * | 11/2000 | Obradovich et al. ........ 701/208 |
| 6,199,045 | B1|   | 3/2001  | Giniger et al. ................. 701/1 |
| 6,295,502 | B1| * | 9/2001  | Hancock et al. ............ 701/201 |
| 6,321,158 | B1| * | 11/2001 | DeLorme et al. ........... 701/201 |

* cited by examiner

Primary Examiner—William A. Cuchlinski, Jr.
Assistant Examiner—Marthe Y. Marc-Coleman

(57) ABSTRACT

An interactive multimedia tour guide provides a user with packaged tours in a multimedia format that includes directions and useful information about a selected tour. The packaged tours are composed of principle and ancillary points of interest. A user profile is developed which is used to generate a preference mask for the user. The preference mask is used to select only those ancillary points of interest that would be of most interest to the user. The selected tour is stored on a portable self-contained electronic system which includes a GPS navigation system and cell phone. The system includes voice recognition software and speech synthesis software to provide the user with a verbal interface That provides directions and information on various points of interest during the tour. Combined with optional camera, the interactive multimedia tour guide allows for rapid identification and editing of pictures or videos made on a tour.

42 Claims, 23 Drawing Sheets

INTERACTIVE MULTIMEDIA TOUR GUIDE

BACKGROUND OF THE INVENTION

1. Field of the Invention

The present invention generally relates to the field of electronic tour guides and, more particularly, to an interactive multimedia tour guide that includes packaged tours in a multimedia format and which provides directions and useful information about a selected tour as the tour progresses. The packaged tours are part of a Geographic Information System (GIS) database, and a selected tour is controlled by the Global Positioning Satellite (GPS) system. The user interface includes voice recognition and speech synthesis to provide audible directions and prompts and to respond to voiced commands. The interactive multimedia tour guide allows the user to modify the packaged tour while in progress and, in addition, serves the function of a concierge to identify dining and lodging options and to make reservations for the user. The flexibility of the interactive multimedia tour guide allows the user to begin a tour at any point and to change the tour as the spirit dictates, allowing the user an unprecedented degree of freedom in their sightseeing. Combined with optional still or video camera, the interactive multimedia tour guide allows for rapid identification and editing of pictures or videos made on a tour.

2. Background Description

Sightseeing has become an abiding pastime for many people who are eager to see and learn about new things. To take advantage of this, many tour book authors and publishers have generated a vast amount of information to assist the eager travelers. Most big cities have tour buses with tour guides that provide a running commentary on notable buildings and events as the tour bus passes through various sections of the city. Sometimes it is possible to hire a knowledgeable taxi cab driver to provide a more personal tour of a city. However, once outside the city, the tourist is more or less left to his or her own devices guided only by one or more of the many tour books available on the market. This can be a problem because on the one hand there is a large amount of information and on the other hand a dearth of information. It is often difficult to find just the information needed for a particular tour. The information may be there in all those tour books, but it is buried and hard to find.

Consider an example. Suppose that a couple wanted to take a nice day trip to visit several wineries in the region. Assuming that there are a number of wineries, the question arises, which ones to go to on this particular day trip? How many can we see, and what else might be in the same general locale that might be of interest? Is there a country inn where lunch or dinner might be enjoyed? And if we were to spend two or more days in the wine country, are there bed and breakfasts or other suitable lodging? Clearly, by the time one researches all these topics and determines where to go, what to see and, if dining and lodging is desired, where to eat and stay, it is quite possible that something more familiar not requiring all this work will be the alternate choice. But even if one were to undertake the logistical planning involved, there are inevitably surprises. The hours listed in the tour book have changed since the book was published, there are fees that had not been anticipated, and that picnic you had planned to have at one of the wineries for which you had purchased the nice loaf of French bread and the cheese to be enjoyed with the wine you were going to purchase, well the winery does not allow picnics on the property or does not have the required off license for you to consume the wine off premises. And that country inn that is so highly recommended, it requires reservations at least a week in advance—it is after all highly recommended.

The problem is not unique to wineries, of course. Those interested in history might enjoy a tour of Revolutionary War and/or Civil War battle fields or historic houses. Others interested in the great scenic wonders of the country might want a tour of some of our National Parks. Again, for either of these topics there are a great many books to pore over plotting out a strategy of where to go and what to do. But no matter how carefully one may plan, something may be omitted or a turn missed, making an eagerly anticipated tour something less memorable than had been anticipated.

The problems are exacerbated when one contemplates a tour of a foreign country, particularly when one is unfamiliar with the language. For many, the answer is a pre-packaged tour, typically on a crowded bus with a translator/tour guide. On such a tour, one is herded with the mass like so many cattle from one photo opportunity to the next without ever having the time the fully appreciate the historical significance or beauty of the place. Quite often on return home, when reviewing the pictures taken, the traveler wonders where some of his or her pictures were taken and what was the subject of the picture.

SUMMARY OF THE INVENTION

It is therefore an object of the present invention to provide an interactive multimedia tour guide which provides a user an experience equivalent to having a personal tour guide.

It is another object of the invention to provide an interactive multimedia tour guide which is portable, allowing the user to carry the interactive multimedia tour guide with them on foot, on a bicycle, or in an automobile or other conveyance.

It is a further object of the invention to provide an interactive multimedia tour guide which allows the user complete flexibility not only in the planning of a trip, but also during the trip.

It is yet another object of the invention to provide an interactive multimedia tour guide which allows the user a choice of language with which to interact with the tour guide thereby providing the user with the equivalent of a translator.

It is still a further object of the invention to provide an interactive multimedia tour guide which includes an optional digital camera connection so that a picture or video taken with the camera will be automatically date and time stamped and provided with the location and a brief description of the subject of the picture.

According to a preferred embodiment of the invention, the interactive multimedia tour guide is implemented using a GPS (Global Positioning Satellite) system enabled map program with a GIS (Geographic Information System) database running on a computer. Tour data are prepackaged and stored on computer readable media, and this data may be correlated to a hard cover book that describes the tours. The data may be updated online by down loading data from Internet Web sites prior to taking a tour. In addition, for those destinations having a Web site, the interactive multimedia tour guide may access that Web site via a wireless phone, such as a cell phone, on approach to the destination as determined by the GPS system.

The interactive multimedia tour guide can be used in several ways. First, the interactive multimedia tour guide can be used in a home computer system to preview tours, much as a hard cover book equivalent would be used, by accessing the GIS database. One advantage over a hard cover book is that the computer system can be connected via the Internet to a Web site that will provide the latest information on the destinations in a tour being reviewed. Such information might include opening times, admission prices and discounts, amenities, and the like which may change from time to time and season to season. The text of the tour description includes hyperlinks to those destinations having Web sites so that the latest information provided by the destinations themselves may be accessed. The user can select a tour and, by means of a print icon displayed on the computer screen, open a menu to select a print out of a map of a tour and printed text description of tour highlights, as updated by access to one or more Web sites. With this information, the user may then go on the selected tour. However, rather than print the tour, the user can download the tour to a Personal Digital Assistant (PDA) having an attached GPS module. Now the user is able to take the tour using the convenience of the PDA with the added guidance provided by the GPS module.

All the tours include various other points of interest in addition to the primary destinations in a given tour. The primary destinations are referred to as principle points of interest. These are the "backbone" of the tour; that is, other points of interest hang on this backbone. The other points of interest are referred to as ancillary points of interest and also would be identified on the printed tour map and accompanying text. The user has the ability to customize the tours to his or her own personal preferences. The interactive multimedia tour guide provides a series of menus that seeks to develop a profile of the user as well as direct answers to the user's personal likes and dislikes. This might occur in the process of loading the interactive multimedia tour guide on the user's personal computer for the first time, but might be subsequently updated at any time by the user, perhaps to include the preferences of a traveling companion. Thus, while there may be a great deal of information in the database of the interactive multimedia tour guide about many ancillary points of interest which are not the primary subject of a particular tour, only those ancillary points of interest which correspond to the preferences of the user, or the user and the user's companion(s), would be included in the printed map and accompanying text.

The user is not confined to one of the prepackaged tours in the database. For those not particularly familiar with an area, the prepackaged tours make an ideal choice, but for those more adventurous, it is also possible to craft a customized tour. This is done by previewing two or more of the prepackaged tours. When a tour is previewed, the principle points of interest are displayed in a slide show comprising still pictures and possibly video and audio clips to give the user an idea of what he or she will experience on the tour. After previewing two or more prepackaged tours, the user may want to mix and match principle points of interest from several tours to generate his or her own customized tour. This is done by means of a menu which shows the several principle points of interest which have been previewed with a box to check (or uncheck) in order to select the principle points of interest the user would like in his or her tour.

Once a tour has been selected, however, a second way the interactive multimedia tour guide can be used is on the tour itself. A GPS receiver and GPS enabled map program are required. To support the full range of user interaction with the computer system, the computer system also requires a microphone, speaker, a voice recognition system, and a speech synthesis system with a text to speech module. Since one preferred environment for the interactive multimedia tour guide is a private automobile, the speakers of the automobile's stereo system may be used, and for those automobiles with integrated GPS systems, the GPS receiver can also be used. It is even possible to fully integrate the computer system in the automobile, but this is not necessary as a portable or laptop computer system or a pocket computer system or PDA may be used, allowing the interactive multimedia tour guide to be easily transferred from one automobile to another or carried by the user. This portable electronic system can be easily moved from one automobile to another, avoiding the incompatibilities of various proprietary integrated GPS navigation systems in different makes of automobiles. Moreover, a user might fly to a particular destination and use the interactive multimedia tour guide in a rental car.

In a preferred embodiment, a special purpose portable electronic system implementing the interactive multimedia tour guide is provided. This system can be used while touring on foot or bicycle as well as in an automobile. In addition to the GPS system, this portable electronic system includes an integrated wireless mobile telephone communication system, such as a cell phone or other personal communication service.

In this second mode of operation, the portable electronic system displays a map of the selected tour and the location of the GPS receiver (i.e., the location of the user or the automobile) on the map. Once a tour is initiated, the portable electronic system displays a map, showing the user's current location, and provides audible directions en route. For greater map detail, the user can voice the command "ZOOM IN" to better show the immediate surroundings of the user's current location. This command can be repeated multiple times, to the limit of the resolution of the map. Likewise, the user can voice the command "ZOOM OUT" to provide a better perspective of the user's location on the selected tour. Similarly, the voiced commands "PAN RIGHT", "PAN UP", etc. can be used to pan the displayed map in a desired direction.

En route, the portable electronic system also provides audible descriptions of ancillary points of interest, offering the user the option of visiting any of the ancillary points of interest. The user can alter the tour in progress by voicing the command "DIRECTIONS" followed by any one of the principle points of interest on the tour. The computer system responds to this command by activating the speech synthesis system to provide audible directions from the user's current location to that point of interest, thereby allowing the user to modify the tour at will. In addition, there may be amenities along the route, which are not specifically in the tour or even mentioned during the tour, for which the user may require directions. An example might be the currently closest fast food establishment to satiate the appetites of young children in the automobile. The map database contains such information, and the computer system can provide the audible directions when requested.

On approach to a destination on the tour, the computer system, activated by distance information from the GPS system, activates the speech synthesis system and the text to speech module to give the user a description of what he or she is about to see and do. If the interactive multimedia tour guide is used in an automobile, the occupants would hear this information on the speaker system. This information might include a brief history of the place, significant facts, personalities and amenities. This information may include spoken or audible information and video clips. However, for safety sake, if used in an automobile, video clips are inhibited while the automobile is in motion. For example, on a winery tour, the history of the winery to be visited, the proprietor and the winemaker, and types of grapes grown and wines produced might be described. A video clip in this case might be a brief interview with the proprietor and/or winemaker and show the harvest, crush and pressing operations. If the destination has a Web site and the computer system is connected to a cell phone, the Web site can also be automatically accessed, again triggered by location as determined by the GPS system.

A particular advantage of the interactive multimedia tour guide is the possibility to deviate from the selected tour. When the interactive multimedia tour guide determines from the GPS position data that an ancillary point of interest which corresponds to the preferences of the user, say a Civil War battlefield site or other historical site is close by, the interactive multimedia tour guide will notify the user of the site and inquire whether the user would like to deviate from the current tour to visit the site. Should the user decide to visit the site, he or she would respond with the voiced response "YES". The interactive multimedia tour guide would then provide directions and commentary about the site. Once the site had been visited, the user would then voice the command "RETURN TO TOUR", and the interactive multimedia tour guide would provide the directions to return to the original tour.

In another scenario, let us assume that a couple has set out on a selected day trip to tour several wineries. As the day wears on, they might decide that it would be nice to have lunch or dinner at an inn or restaurant in the vicinity. Ordinarily, this might pose a problem unless they and anticipated the possibility and determined where such an inn or restaurant might be located. With the interactive multimedia tour guide, such prior planning is not required. The user simply voices the command "FIND DINING" or, more simply, "FOOD", but of course the latter voiced command could be used to find groceries for, say, a picnic. The interactive multimedia tour guide searches its database and identifies those establishments which are reasonably close. These are then read to the user, providing distance and an approximate time of arrival, type of cuisine, dress requirements, and whether reservations are recommended or required. Should reservations be recommended or required for a selected inn or restaurant, the user can voice the command "CALL" to establish a telephone connection for the purpose of making reservations.

Similarly, should the day trip be sufficiently enjoyable that the couple decides that it would be nice to extend the trip for another day, the user of the multimedia tour guide can voice the command "FIND LODGING", and the interactive multimedia tour guide will search its database to identify those bed-and-breakfasts, motor lodges, camp grounds, and the like which are reasonably close or perhaps close to another selected tour to be taken on the following day. As before, the interactive multimedia tour guide would provide distance and approximate time of arrival for each establishment identified. The user would again voice the command "CALL" to establish a telephone connection for the purpose of making reservations.

The portable electronic system implementing the interactive multimedia tour guide, being sufficiently portable, can be used while touring on foot or while touring on bicycle, say in a city such as Paris where there are many sights to see most advantageously while walking rather than in an automobile or a bus. To best use the interactive features of the invention in this environment, a lightweight headset containing a miniature microphone and earphone may be worn. The headset could be integrated into a pair of sunglasses or a hat, to be less conspicuous, or worn independently. In addition, if the user does not speak French (or other language of the country or city visited), the interactive multimedia tour guide includes a database of languages, allowing the user to choose the language with which to interact with the tour guide. This database is also used to assist the user in conversing with locals by providing translations of commonly used phrases. This can be done both audibly and by a graffiti script written with a stylus on the hand-held display which includes an integrated Personal Digital Assistant (PDA) function.

The interactive multimedia tour guide may optionally include a connection to a digital camera. When activated, a picture or video taken with the camera can be stamped with time and day data and, in addition, provided with location and a brief description of the subject of the picture. When pictures are later downloaded to the user's personal computer from the camera's memory card or other memory device, accurate information about the picture or video is included with each picture or video clip. The pictures may be either still or video which may be edited on a personal computer by the user for archiving and presentation.

It will be appreciated that one of the significant features of the interactive multimedia tour guide is the possibility of modifying the tour while en route. This ad hoc feature makes the interactive multimedia tour guide very much like a private personal tour guide and concierge. And while the preferred embodiment contemplates the primary use of the interactive multimedia tour guide in an automobile, the portable nature of the interactive multimedia tour guide makes pedestrian tours quite practical. This is a particular advantage when touring foreign countries in which user is not fluent in the national language. Obviously, a combination of motor tour and pedestrian tour is also possible with the interactive multimedia tour guide.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
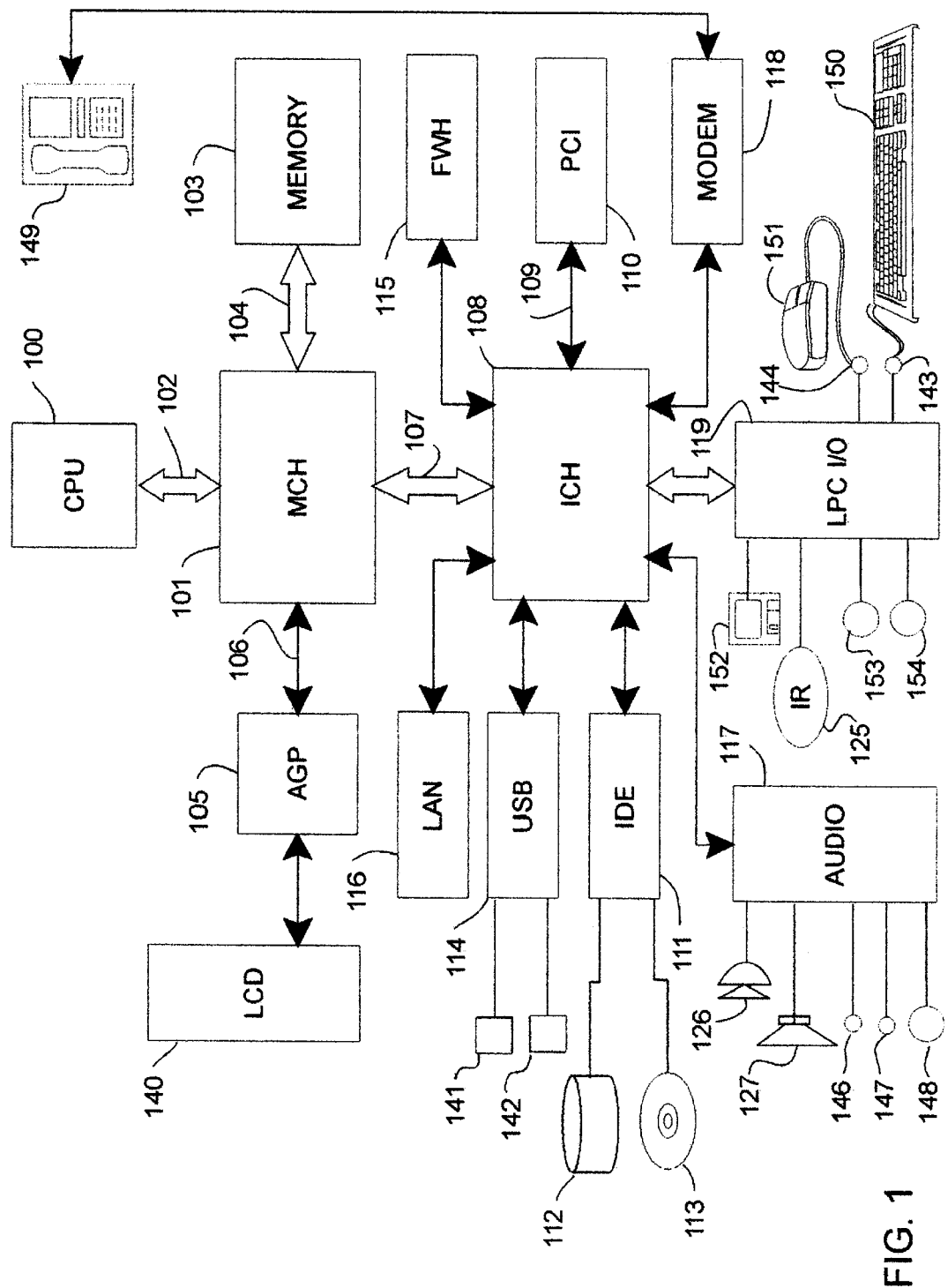
FIG. 1 is a block diagram of a personal computer system on which the interactive multimedia tour guide may be installed for the purpose of previewing and selecting tours and, optionally, editing pictures taken during a tour.

Referring now to the drawings, and more particularly to FIG. 1, there is shown a computer system architecture on which the interactive multimedia tour guide may be installed for the purpose of previewing, selecting and customizing tours. The computer system includes a central processor unit (CPU) 100 connected to a memory controller hub (MCH) 101 via a system bus 102. The MCH 101 is connected to a random access memory (RAM) 103 via a direct memory bus 104, such as a bus meeting the Rambus specification, and a video graphics chip 105, such as the accelerated graphics port (AGP) graphics chip, via a video bus 106. A display screen 140, such as a liquid crystal display (LCD), is connected to the AGP graphics chip 105.

The MCH 101 is further connected via high speed interface 107 to an input/output (I/O) controller hub (ICH) 108. The ICH 108 provides connection to a personal computer interface (PCI) bus 109, to which is attached one or more PCI slots 110 for option cards, an integrated device electronics (IDE) controller interface 111, to which a hard drive 112 and a removable media drive 113, such as a compact disk/digital video disk (CD/DVD) drive, are attached, a universal serial bus (USB) controller 114 connecting to the USB ports 141 and 142, and a firmware hub (FWH) 115. Operating system (OS) software is installed on the hard drive 112. Voice recognition and speech synthesis software also may be installed on the hard drive 112, but this is not necessary for the purposes of previewing and selecting a tour. The ICH 108 integrates a local phone network port and an Ethernet network port in local area network (LAN) connection 116. The ICH 108 also provides an interface to a multiple channel audio interface 117, to which microphone 126 and speaker 127 and stereo speaker jacks 146 and 147 and headphone and microphone set jack 148 are connected. The ICH 108 interfaces with a modem 118 for optional connection to the Internet. This may be by dial-up connection via telephone 149, or the modem 118 may be a cable modem or other interface to the Internet.

If the interactive multimedia tour guide is distributed on removable media such as a CD or DVD, the supporting software is first installed on the hard drive 112 and the content read from the removable media. In the alternative, the interactive multimedia tour guide may be down loaded from the Internet and stored on the hard drive 112. It is possible, for example, for the hard drive to store multiple interactive multimedia tour guides, and the computer system would be a repository or library of tour guides.

The ICH 108 also provides a low pin count (LPC) interface to a super I/O device 119 supporting a keyboard 150, mouse 151, floppy disk drive 152, and parallel and serial ports 153 and 154, respectively. The keyboard and mouse connections may be either through the IR transceiver 125 or the PS/2 ports 143 and 144, respectively.

The interactive multimedia tour guide includes a GIS database including many points of interest. In many printed tour guides, the various points of interest will the rated by the author of the tour guide in an order of importance. This might be, for example, by using a series of stars next to the point of interest with, say, four stars indicating the most important sights and no stars indicating only passing interest. While there is general agreement among authors of printed tour guides about ratings of many points of interest (e.g., Westminster Abbey in London universally rates four stars), inevitably the ratings reflect a particular author's own personal prejudices. If we were to hire a personal tour guide in a particular city, that tour guide would also provide a tour based on his or her prejudices. The prejudices of an author or personal tour guide may not correspond to the preferences of one going on the tour. What would be desirable is to interview the tourist to find out his or her personal preferences in order to show the tourist those things that may be of the most interest to him or her. The interactive multimedia tour guide according of this invention does this, as shown in FIG. 2, to which the reader's attention is now directed.

Figure 2:
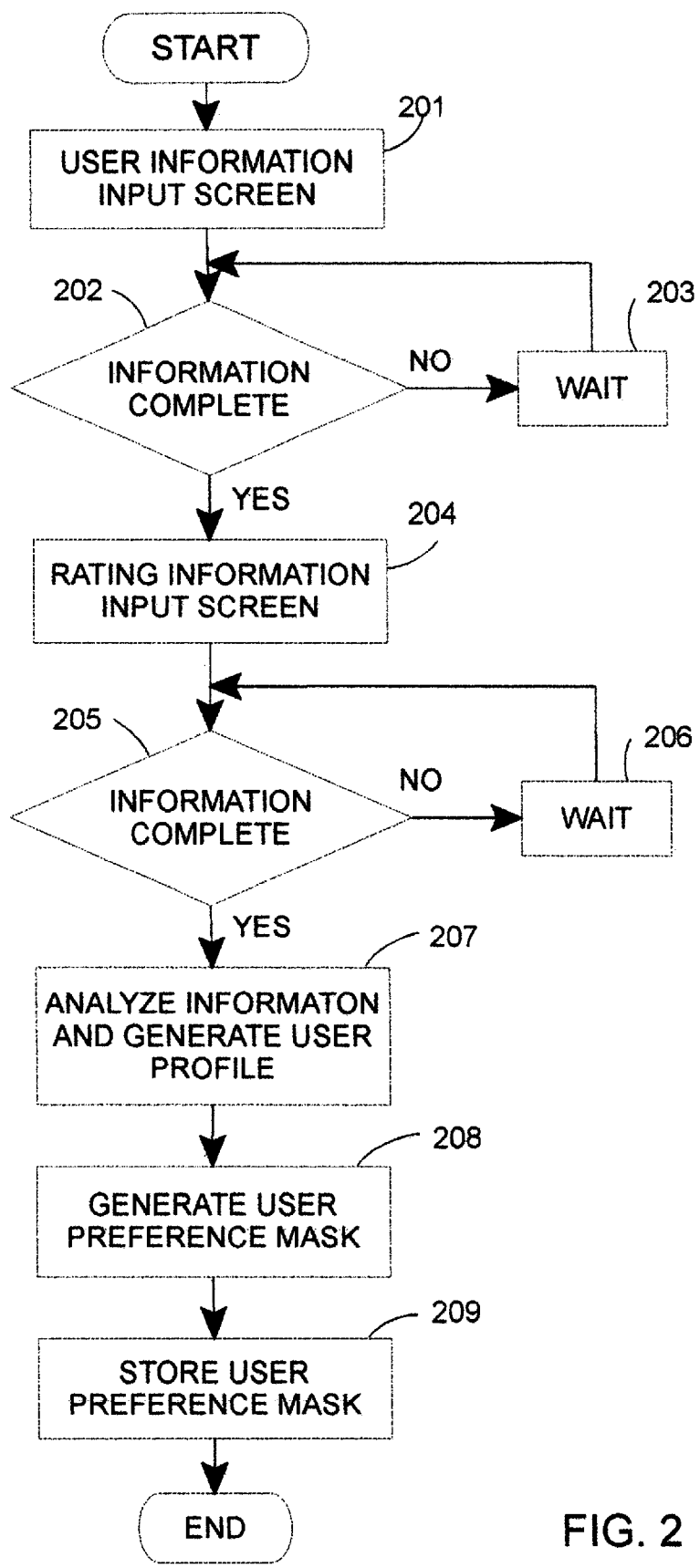
FIG. 2 is a flow diagram showing the logic of the process of determining a user's preferences in order to generate a preference mask used in selecting points of interest from the GIS database.

FIG. 2 is a flow diagram showing the process by which the user's preferences are determined. From these preferences, a preference mask is generated. This preference mask is used to make a selection of those ancillary points of interest that may be most interesting to the user. This process is done on initial program load, but may be done again at a later time, either to update the user's preferences or to include the preferences of a traveling companion. The process starts in function block 201 which displays a screen in which the user is prompted to enter information about himself or herself This information may include, for example, the user's age, gender, ethnic origin, level of education, field of education, vocation, hobbies, special interests, and the like. This is the objective data used to generate a profile of the user which, in turn, is used to select those ancillary points of interest which may be of most interest to the user. Since this information may be considered sensitive to the user, the various fields may be made optional, allowing the user to opt out of entering the information. However, to provide the best tours for the user, it is preferable to encourage the user to input the information, which may be encrypted and securely stored so that the information may not be accessed when a Web site is accessed on the Internet. In decision block 202 a test is made to determine if all the information requested has been entered or, optionally, whether the user has entered all the information he or she desires to enter and opted not to enter certain other information. If not, the process waits in function block 203 until the user has completed entering profile information. When the user has completed entering profile information, the process then goes to function block 204 which displays another screen in which the user is asked to rate various types of points of interest, such as museums, parks and gardens, historic houses, amusements, types of restaurants and lodgings, etc. This rating system may be, for example, on a point system of one to five, with five indicating a high interest and one indicating a low interest. This is the subjective data used to generate the profile of the user which, in turn, is used to select those ancillary points of interest which may be of most interest to the user. In other words, both objective and subjective data is used to generate the user profile. A determination is then made in decision block 205 as to whether the user has completed rating the various types of points of interest and, if not, the process waits in function block 206 until the user completes the rating process. Once the rating process is completed, the information input by the user is analyzed in function block 207 to generate a user profile. The process of analyzing the user's profile may include an expert system. The result of the analysis is then used to generate in function block 208 a "mask" of preferences that will later be used to select ancillary points of interest to be presented to the user on a selected tour, along with the principle points of interest. This mask of preferences is then stored in function block 209 on hard drive 112 of the computer system shown in FIG. 1 for later access. The user may wish to include one or more travel companions who may each go through the process shown in FIG. 2, in which case there would be separate masks of preferences for each such travel companion and these would be stored on the hard drive 112 for later access. Thus, in the process of selecting a tour, the user may indicate that he or she is traveling with one or more companions, each having a stored mask of preferences. As will be seen in the selection process shown in FIGS. 3A to 3E, these various masks of preferences will be accessed to determine the points of interest selected from the GIS database for presentation during the tour.

In the GIS database according to the preferred embodiment of the invention, points of interest are rated as principle points of interest, ancillary points of interest, and amenities. However, it will be understood by those skilled in the art that a different rating system or more or less levels of rating could be used in the practice of the invention. The principle points of interest are the "backbone" of a suggested or prepackaged tour. So, for example, on a tour of Washington, D.C., having an emphasis on government, principle points of interest could be the U.S. Capital, the White House, and the Supreme Court, representing the three branches of the Federal Government. The ancillary points of interest are which might be of interest in this tour might be the National Archives where the Declaration of Independence and the U.S. Constitution are housed and on display, the Federal Bureau of Investigation (FBI) building, and the Library of Congress. The amenities in this tour could be various places to eat, such as restaurants and cafeterias, and possibly hotels if one were to decide to spend the night. Different tours would have different principle points of interest and correspondingly different ancillary points of interest. While the tour just described is centered about the Mall in Washington, D.C., this is also the area of many of the Smithsonian Museums. So another tour emphasizing history and technology could have as principle points of interest the Museum of American History and the Air and Space Museum, and a tour emphasizing art could have as principle points of interest the National Gallery of Art (the Mellon Gallery), the Hirshorn Museum, and the Freer Art Gallery, and so on. However, as will be described, suggested or prepackaged tours are just that—suggested. The user of the invention is provided with option of selecting principle points of interest from several prepackaged tours to generate a customized tour, however eclectic it may be, that satisfies the user's interests. Indeed, the user may select an ancillary point of interest and make it into a principle point of interest for his or her own customized tour.

Figure 3A:
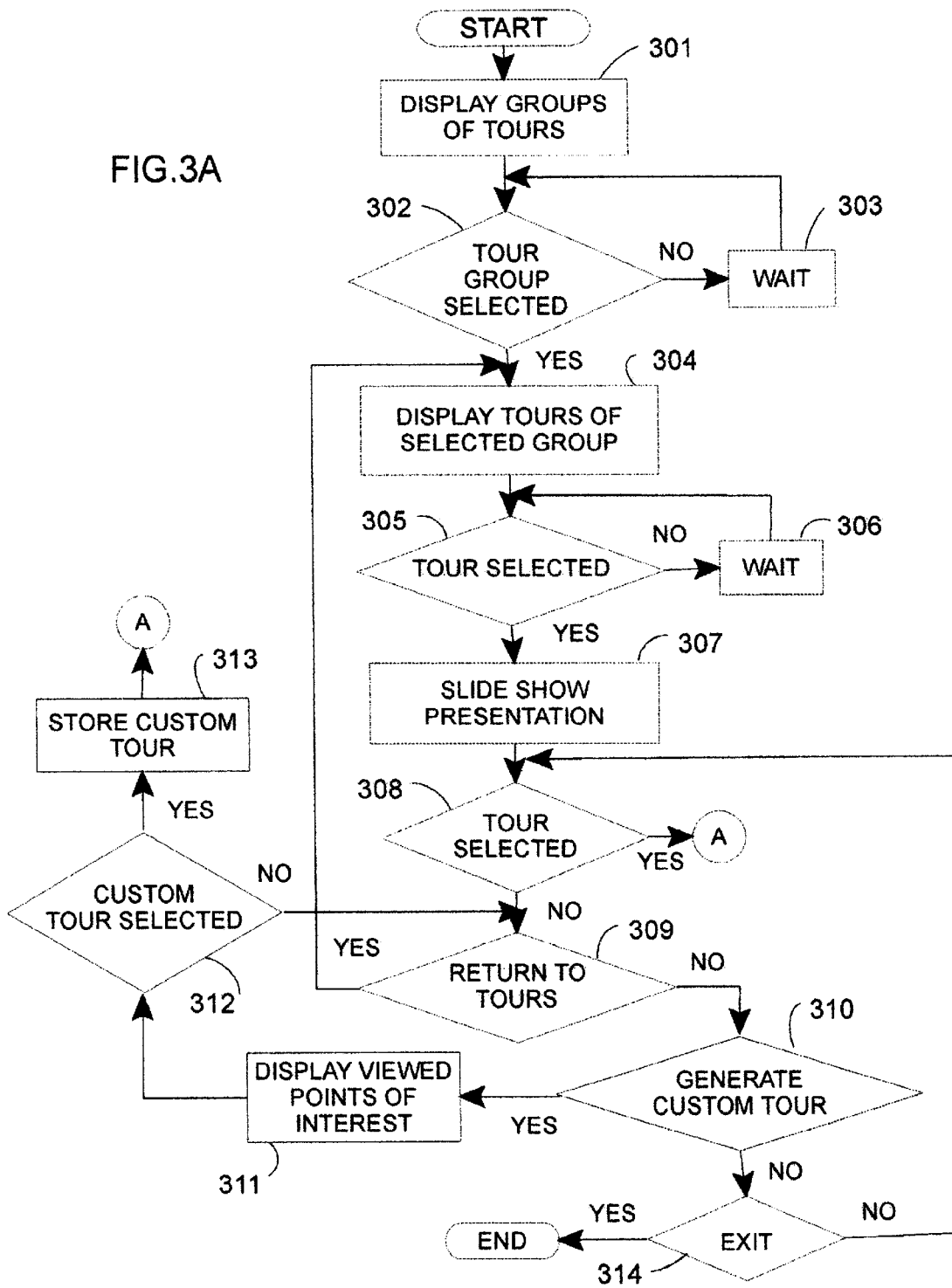
FIGS. 3A to 3E, taken together, form a flow diagram showing the logic of the process of previewing tours for selection, customization, updating information in the database and, after selection and/or customization, printing a selected tour map with accompanying text.
Figure 3B:
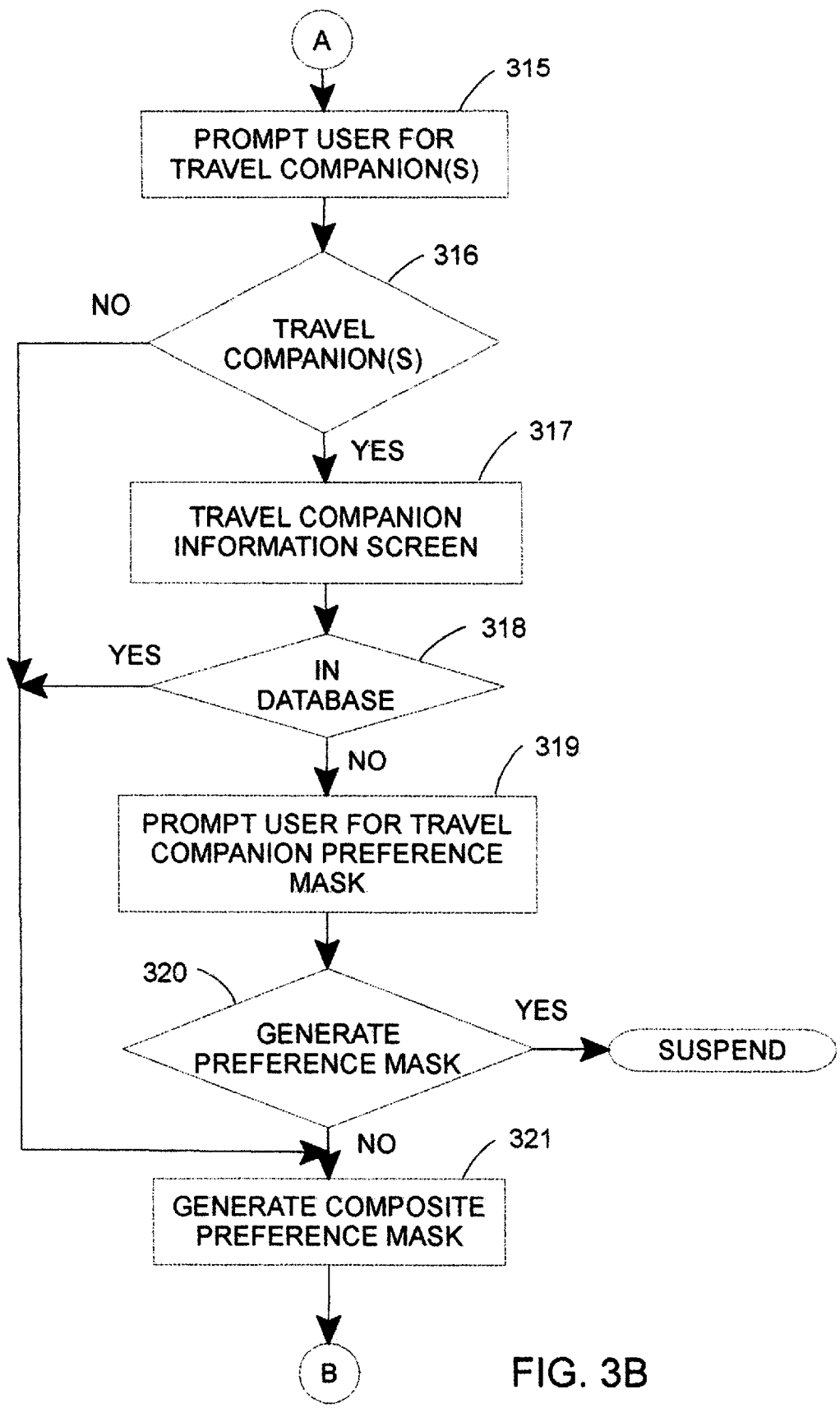

Turning now to FIG. 3A, the process of selecting a tour begins at function block 301 where a screen is displayed showing the various tours grouped in some fashion, as for example by geographical location or theme. To illustrate, suppose the tour guide were for wineries. The state or country or region which is covered by the tour guide would be divided into geographical locations, e.g., north east, south, etc., and within each grouping by geographical location would be a number of pre-packaged tours of, say, three wineries which could be selected as a day trip. In another example, suppose the user were planning a trip to Paris and hoped to sightsee in both the city and its environs. In this case, tours might be grouped by geographical location, say quadrants, within the city and by day trips out of the city. Rather than geographical location, the suggested tours might be grouped according to theme; e.g., politics, art, history, etc. Of course, other groupings of selected tours are also possible. In any case, the user would be prompted to select one of the groups of tours. A determination is made in decision block 302 as to whether a group of tours has been selected and, if not, the process waits in function block 303 until a selection has been made. Once the user makes a selection of a group of tours, the process goes to function block 304 where a screen is displayed showing the suggested tours in the selected group. Again, the user is prompted to make a selection of one of the suggested tours. A determination is made in decision block 305 as to whether the user has selected one of the displayed suggested tours and, if not, the process waits in function block 306. When the user selects a suggested tour, a slide-show presentation of the principle points of interest for that tour is accessed and displayed to the user in function block 307. The presentation may include a map of the tour, still pictures and video and audio clips to better provide the user with a preview of what is in store if this tour is finally selected as the tour the user wants to go on. At the end of the slide-show presentation, the user is given several options. In decision block 308, determination is made as to whether the user has made the previewed tour his or her final selection. If not, the user has the option of returning to the screen displayed in function block 304 to select another tour to preview, and this is detected in decision block 309. The user also has the option of selecting one or more of the principle points of interest of one or more previewed tours to make his or her own customized tour. This is detected in decision block 310, in which case a list of those principle points of interest which have been viewed in the previewed tours is displayed to the user in function block 311. This display includes boxes to check (or uncheck) in order to select the principle points of interest which the user would like to have included in his or her customized tour. The user is then prompted in function block 311 either to select the customized tour, return to the suggested tours in function block 304, or to exit the process. The first option is detected in decision block 312, in which case the customized tour is stored in function block 313 and the process goes to function block 315 in FIG. 3B. The second option is detected in decision block 309, in which case the process goes back to function block 304; otherwise, the option of exiting is detected in decision block 314. If the last choice is chosen by the user, the process ends Should the user select a suggested tour, as detected by decision block 308, or a customized tour, as detected by decision block 312, the process goes to function block 315 in FIG. 3B where the user is asked whether he or she will be accompanied by one or more traveling companions. If the user's answer is YES, as determined in decision block 316, then the user will be prompted in function block 317 to input the name or names of their traveling companion or companions, and if the computer does not have a traveling companion's name in its database of preference masks as determined in decision block 318, the user will be asked in function block 319 whether a preference mask should be generated for the traveling companion. If the user's response is YES, as determined in decision block 320, the process will suspend and exit to the process shown in FIG. 2 in order to generate a preference mask for the traveling companion. If the user is not traveling with a traveling companion, as determined in decision block 316, or if any and all travel companions identified are in the database of preference masks as determined in decision block 318, or if the user decides that a preference mask should not be generated for a traveling companion, as determined in decision block 320, the process next goes to function block 321.

In function block 321, a composite preference mask is generated. If the user is traveling alone, the composite preference mask is simply the user's preference mask, but if the user to be accompanied by one or more traveling companions, the composite preference mask is generated as a function of all the preference masks. The simplest function is the Boolean OR function, but more complex functions may be used to generate the composite preference mask. For example, there may be certain likes and dislikes of the user and his or her traveling companions which may be weighted so as to cancel a particular preference in one or the other of the preference masks used to generate the composite preference mask. Suppose that the user and his or her traveling companion are touring Vienna and that the user is an afficionado of opera and his or her traveling companion has but little interest in opera but is interested in the culture of the city, then it may be that one of the ancillary points of interest to include in the tour is the opera house. On the other hand, suppose that the user and his or her traveling companion are touring Madrid and that the user is strongly opposed to cruelty to animals and his or her traveling companion has a broad interest in sports, then it may be that the football (soccer) stadium would be one of the selected ancillary points of interest but not the bull ring.

Figure 3C:
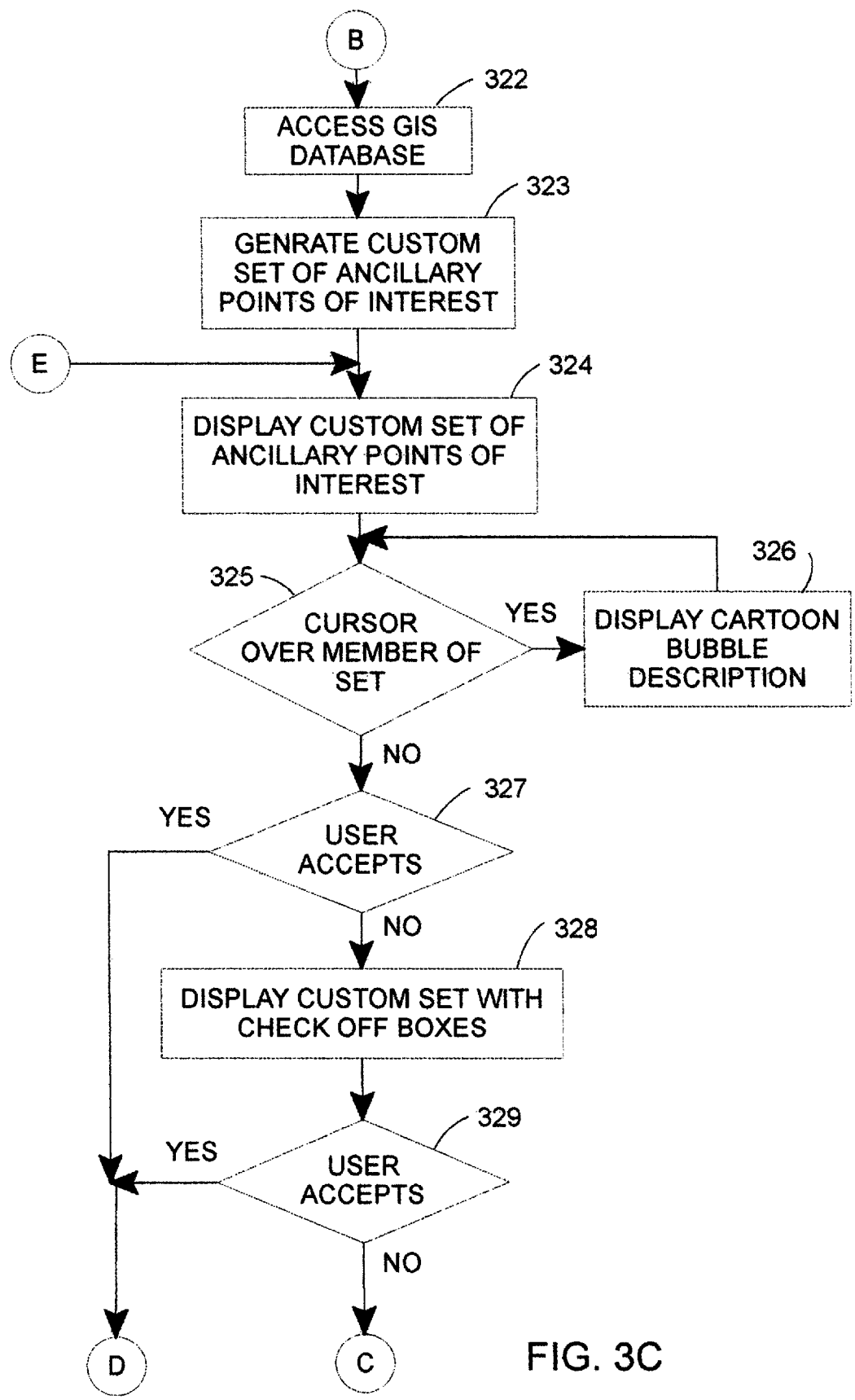
Figure 3D:
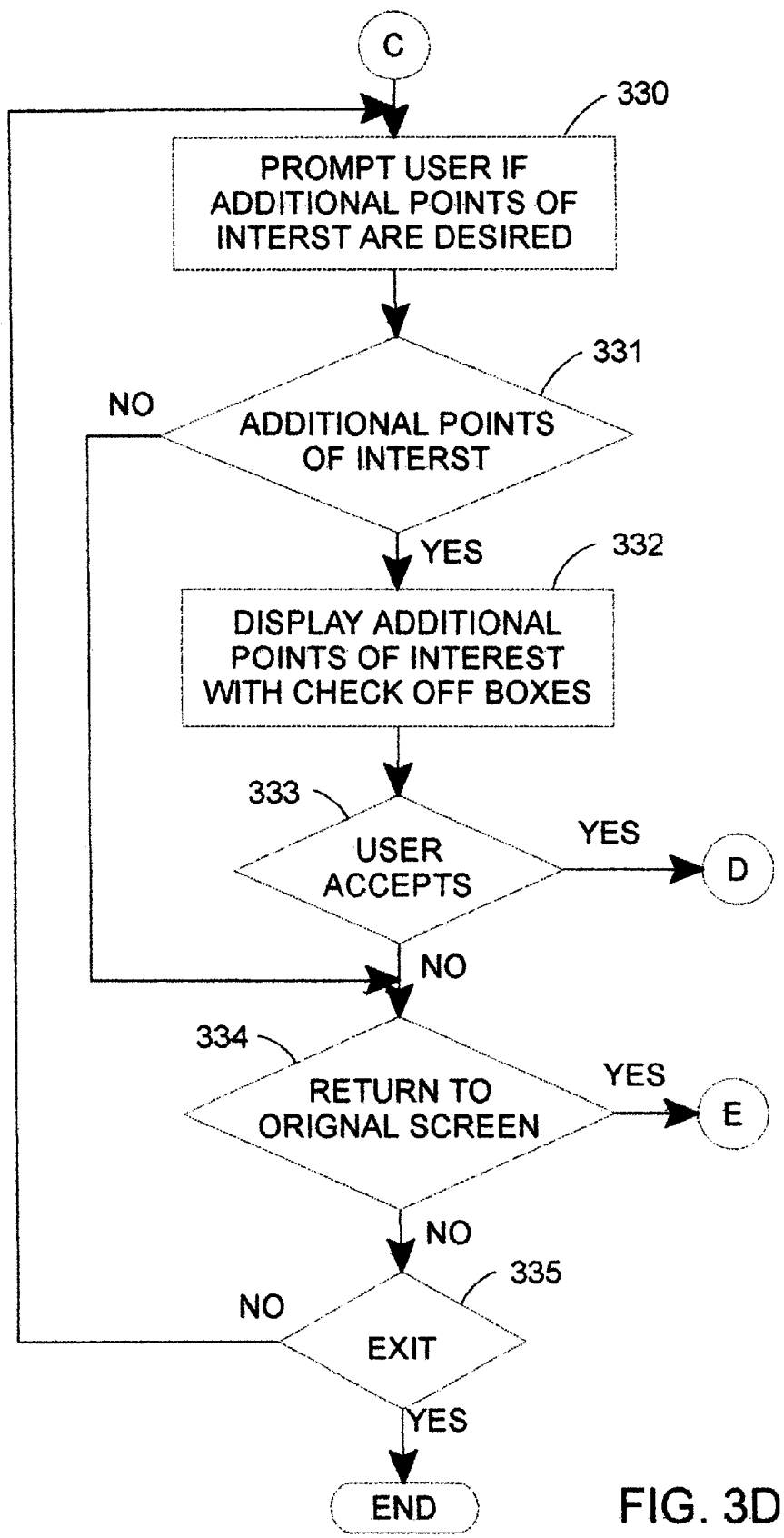
Figure 3E:
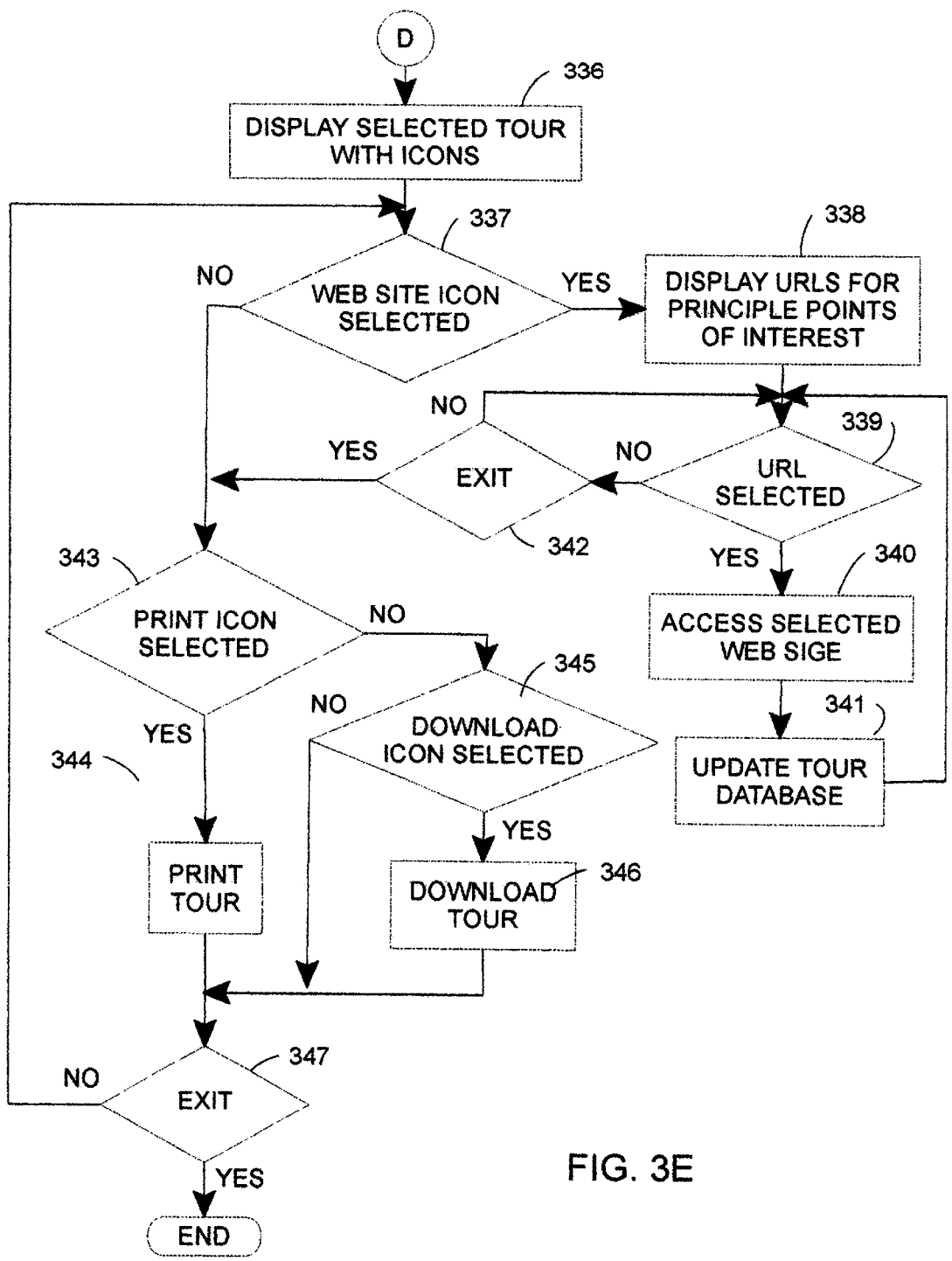

Once the composite preference mask is generated, the process goes to FIG. 3C where the GIS database is accessed in function block 322 to access all the ancillary points of interest for the selected or customized tour. The composite preference mask is then used in function block 323 to generate a custom set of ancillary points of interest for the user and his or her traveling companion(s). A list of the custom set of ancillary points of interest may then be displayed to the user in function block 324, each point of interest being linked with a brief statement describing the point of interest in a cartoon bubble. By placing the pointing cursor over one of the displayed ancillary points of interest in the custom set of ancillary points of interest, as determined in decision block 325, this link is activated in function block 326 to display the brief statement describing the point of interest in the cartoon bubble. Alternatively, the displayed ancillary points of interest may be anchors for hyperlinks to a more detailed explanations of the ancillary points of interest, including possibly a slide show including video and audio clips that provide a more in depth explanation of the ancillary point of interest.

The user is prompted in the display provided in function block 324 as to whether the custom set of ancillary points of interest is acceptable. If not, as determined by decision block 327, the displayed list of ancillary points of interest provided in function block 324 is modified in function block 328 to include boxes which the user may check (or uncheck) to exclude specific ones of the selected ancillary points of interest from the custom set. The user is again prompted in this modified display as to whether the custom set of ancillary points of interest is acceptable with those points of interest which the user has checked (or unchecked) is acceptable. If not, as determined in decision block 329, the process goes to FIG. 3D where the user is asked in decision block 330 if additional points of interest are desired. A determination is made in decision block 331 as to whether the user would like to review additional ancillary points of interest not included in the custom set of ancillary points interest generated using the composite preference mask. If so, in function block 332, additional ancillary points of interest are displayed with boxes which may be checked (or unchecked) to include in the tour. The user is again prompted in this display as to whether the custom set of ancillary points of interest is acceptable. If not, as determined in decision block 333, the user is given options. The first option, detected by decision block 334, is that of returning to the original screen displayed in function block 324 (FIG. 3C). The second option, detected by decision block 335, is that of exiting. Should the user choose to exit, the process ends. When the user is satisfied with the custom set of ancillary points of interest for the tour either as originally generated, as determined in decision block 327 (FIG. 3C), or as modified by subtraction, as determined by decision block 329 (FIG. 3C), or addition, as determined by decision block 333 (FIG. 3D), the process goes to function block 336 in FIG. 3E.

In function block 336, a screen showing the tour selected is displayed. The tour includes the principle points of interest and a custom set of ancillary points of interest, the custom set being generated by the process just described. As mentioned, the principle points of interest of the suggested the tour are the "backbone" of the tour. The display produced in function block 336 includes several icons; a Web icon, a print icon and a download icon. If the Web icon is selected, as determined in decision block 337, the principle points of interest are checked to determine if they have Web sites on the Internet. Those that do will be displayed with their Universal Resource Locator (URL) in function block 338. This display can be conveniently located in a left hand window of the display screen much the same as the search results are displayed when a search engine is used to search on the Internet. By clicking on the URL for a particular principle point of interest, as determined in decision block 339, the user's computer accesses that point of interest's Web site through the user's Internet Service Provider (ISP) in function block 340. The Web page for the selected point of interest can be conveniently located in a right hand window of the display screen. This provides the user with an opportunity to update the tour database to include any changes in opening times, fees and the like in function block 341. After viewing a Web site, the user can click on the URL for another point of interest to be connected to the Web site for that point of interest and, again, update the tour database. When the user is finished viewing Web pages for the principle points of interest, he or she does so by clicking an EXIT button, as determined by decision block 342, which returns the process to the display produced in function block 336. In this way, the user can be assured of having the most up-to-date information relating to the tour that he or she is about to go on. The process can be extended to the ancillary points of interest. Alternatively or in addition to accessing the various points of interests'Web sites, there may be displayed the URL of the publisher of the interactive multimedia tour guide in order to download more up-to-date data for the selected tour. In this case, clicking on the publisher's URL first connects to the publisher's Web site and, once the user has logged into the Web site, the principle points of interest of the user's selected or customized tour are up loaded to the publisher's Web site where updated information is accessed and then down loaded to the user's computer. This might be on a subscription basis.

If the print icon is selected, as determined in decision block 343, the tour map is printed in function block 344 with accompanying text including detailed directions to the principle points of interest of the tour and ancillary points of interest along the way. Also printed would be the amenities, such as inns, bed-and-breakfasts, motor lodges, and camp grounds as well as restaurants, cafeterias, fast food establishments, convenience stores, and the like. At this point, the user has a printed version of a custom tour which can be used conventionally.

Figure 4:
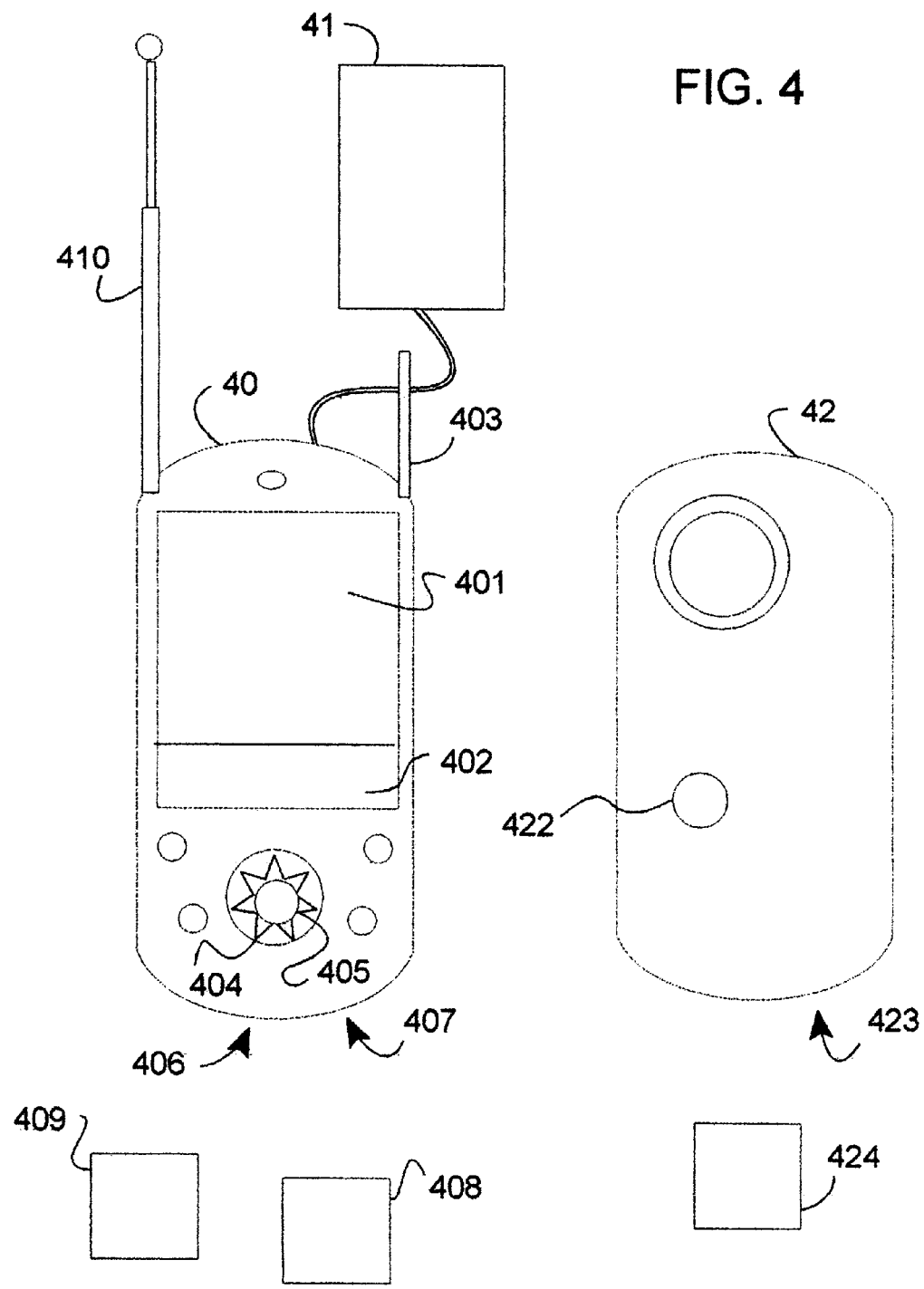
FIG. 4 is a pictorial representation of a personal digital assistant (PDA), with attached GPS receiver, to which a selected or customized tour may be downloaded.

As shown in FIG. 4, rather than print a hard copy of the selected and/or customized tour, the user may instead download his or her tour to a personal digital assistant (PDA) 40 to which is attached a GPS receiver 41, such as the DeLorme Earthmate™ GPS receiver for the Palm™ PDA. This process is accessed by the print icon, the selection of which is detected in decision block 343. When the print icon is selected, the user is asked what printer to use, one of the choices being the PDA. The PDA 40 has a liquid crystal display (LCD) 401 and an area 402 for entering data using the hand writing recognition convention of the specific PDA. For this purpose, a stylus 403 is conventionally provided with the PDA for use on the area 402 to enter hand written symbols. In addition to various control buttons, the PDA 40 may also include a speaker 404 and a microphone 405, as is provided in the Compaq iPAQ™ pocket PC. The PDA 40 typically has an accessory jack 406 which may be used to provide a cable connection to the user's PC via either a serial or USB port. This accessory jack 406 can also be used to connect to a cell phone, such as the Kyocera (formerly Qualcom) cell phone via the Palm™ connectivity toolkit. In addition, the PDA 40 typically has an accessory slot 407 for receiving a flash memory 408. Alternatively, the flash memory may be internal to the unit. Additional memory cards 409, including language translators, may be used in the accessory slot 407 The PDA 40 may be connected to the user's PC via a cable connection, as mentioned, or via a wireless connection to an infrared (IR) port for purposes of down loading the tour. An antenna 410 is provided on the PDA for the wireless connection via a wireless access point (WAP) in a local area network (LAN). Once stored in flash memory, the user is ready to go on the tour with the additional functionality of the GPS navigation system to guide him or her.

The PDA 40 shown in FIG. 4 also may be provided with other accessories which will be useful to the traveler. A digital camera accessory 42 may be added. An example is the Kodak PalmPix™ digital camera for the Palm PDA. The camera accessory attaches to the back of the PDA and uses the PDA's display 401 as a view finder for taking pictures. The camera accessory has a lens 421 and shutter release 422 and can be provided with a card slot 423 for receiving an additional memory card 424 for storing pictures. A particular feature of this combination is that pictures taken with the camera accessory 42 can be date and time stamped from the PDA's internal clock and, in addition, stamped with location information derived from the attached GPS receiver 41.

Figure 5:
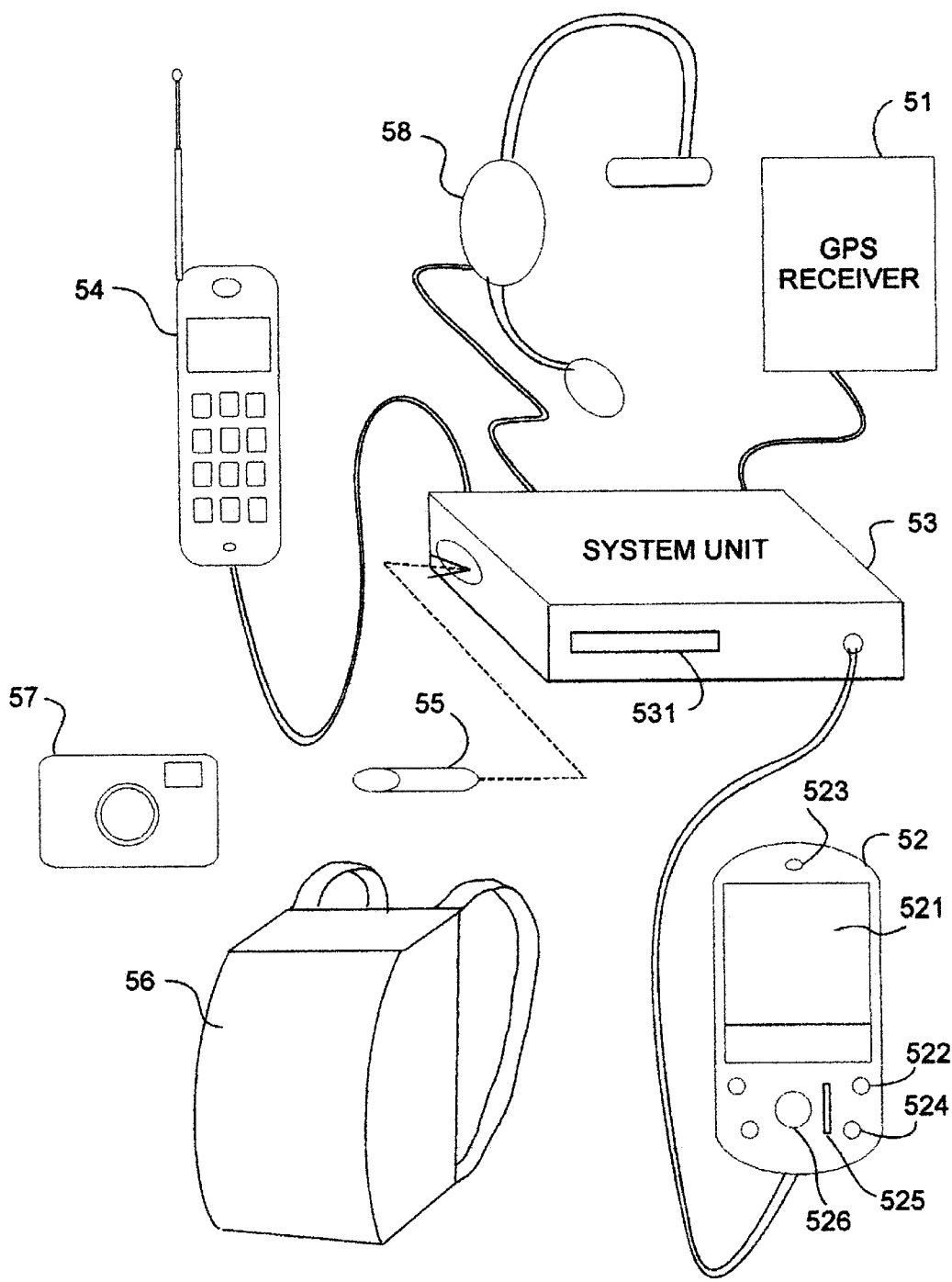
FIG. 5 is a pictorial representation of a portable self-contained electronic system implementing the interactive multimedia tour guide according to a preferred embodiment of the invention.
Figure 5B:
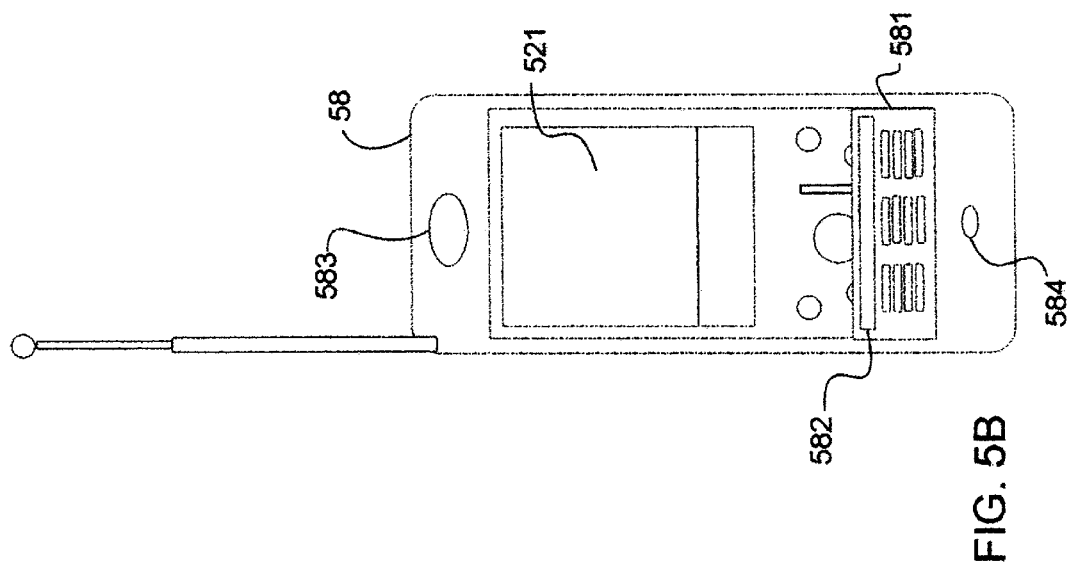
FIGS. 5A and 5B are pictorial representations of the portable self-contained electronic system housed in a unitary structure.
Figure 5A:
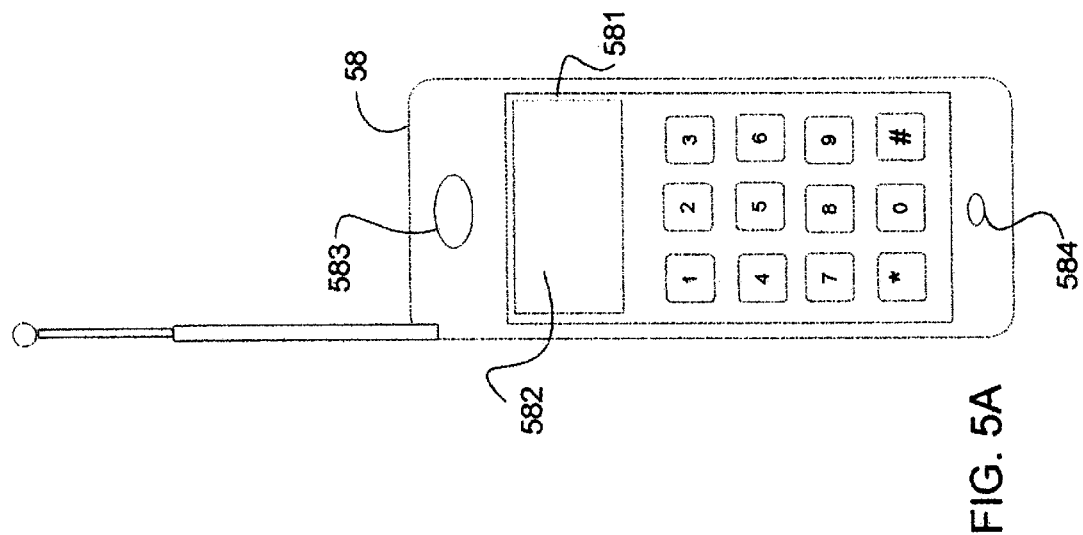

The preferred practice of the invention, however, is to use the principle points of interest with the custom set of ancillary points of interest for the selected tour in a mobile or portable self-contained electronic system implementing the interactive multimedia tour guide, as generally shown in FIG. 5 or, alternatively, in FIGS. 5A and 5B. This can be done also with the PDA 40 shown in FIG. 4 provided it is modified to include the additional functionality to support the interactive functions. With the system shown in FIG. 5 or FIGS. 5A and 5B, the user would connect the portable self-contained electronic system shown in FIG. 5 or FIGS. 5A and 5B to the user's PC (FIG. 1) and click on the download icon. The connection can be wired or wireless, the former including, but not limited to, USB and IEEE 1394 ports, and the latter including, but not limited to, an infrared (IR) port and a wireless access point. When the user clicks on the download icon, as detected in decision block 345, the selected tour, including the relevant parts of the GIS database, are downloaded in function block 346. Notice that this down load is different than the down load just described for the PDA (FIG. 4) in that relevant parts of the GIS database are included in this down load. This is merely a matter of memory capacity, it being assumed that the PDA memory capacity is less than that of the portable self-contained electronic system shown in FIG. 5 and therefore not capable of storing all the relevant parts of the GIS database. Obviously, as memory capacities increase for PDAs, this distinction would not be necessary. By the same token, if the memory capacity of the portable self-contained electronic system shown in FIG. 5 is sufficient, the processes shown in FIGS. 2 and 3A to 3E could be performed on the system without need of doing so on the user's PC and down loading a selected tour. In other words, all the functions of the interactive multimedia tour guide according to the invention may be performed on the portable self-contained electronic system shown in FIG. 5. Finally, referring back to FIG. 3E, the user is given the option to exit in decision block 347. When the user selects this option, the process ends.

The basic components of the portable self-contained electronic system are shown in FIG. 5. These are a GPS receiver 51, a hand-held display 52, a system unit 53, a wireless mobile telephone 54, such as a cell phone or other personal communication service, a power supply 55, a carrying case 56, and an optional digital camera 57. Since this is an interactive system, there needs to be both microphone and speaker to permit the user to communicate with the interactive multimedia tour guide. The microphone and speaker are also used for the telephone 54 in hands free operation. For pedestrian tours, the microphone and speaker may be incorporated into an optional headset 58. The headset 58 may be integrated into a pair of glasses, say sun glasses, or a hat, if desired to be less conspicuous when in use, or simply used as is. For automobile tours, the microphone may be incorporated into the display 52 and the speakers may be incorporated into the system unit 53. When the headset 58 is being used, the microphone in the display 52 and the speakers in the system unit 53 are disabled. Optionally, the system unit may be provided with a low power radio frequency (RF) transmitter which transmits at a frequency in an unused portion of the amplitude modulation (AM) or frequency modulation (FM) radio bands, allowing the user to tune the automobile radio to that frequency and, thus, use the speakers in the automobile. The power supply 55 may include a battery, a battery charger and a 12 volt power adapter, the latter being used to connect to an automobile's power connector when used for an automobile tour. The display 52 may be provided with a clip allowing it to be attached to a vent or other convenient place on an automobile dashboard or to the user's belt or the carrying case 56. The display 52 is a convenient size to be hand held and includes a flat panel color display 521, such as a liquid crystal display (LCD), and a set of control buttons, including a PDA/MAP mode button 522, a power on/off switch 523, a location button 524, a zoom in/out wheel 525, and panning roller ball 526. Other manual switch functions could be provided or alternative switch arrangements used, but the intent here is to keep the user interface simple. In addition, for a built-in personal digital assistant (PDA) function of the display 52, a stylus may be provided to allow the user to input information or make menu selections. The system unit 53 incorporates a CD/DVD drive which is accessed by a slot 531. Additionally, connections are provided for each of the GPS receiver 51, the display 52, the cell phone 54, and the headset 58. The carrying case 56 has pockets to receive, in addition to the user's own travel accouterments, the GPS receiver 51, the system unit 53, the power supply 55, and accessories and may take any of several convenient forms including a small attache case, which would be suitable for moving the system from one automobile to another, or a small backpack, as shown, which would be suitable for pedestrian and bicycle tours. The optional digital camera 57 includes a calendar/clock for date and time stamping of digital image(s) or video clips, a built-in GPS receiver to provide location information of digital image(s) or video clip(s) and a built-in digital compass to provide orientation information of digital image(s) or video clip(s). The camera is provided with transceiver to allow communication with the system unit 53. The transceiver operates on an industry standard, such as the Bluetooth standard; however, the particular wireless standard used is not critical to the practice of the invention.

An alternative to the camera 57 is a camera attachment 42 for the PDA 40, shown in FIG. 4. Alternatively, the camera attachment 42 could be used on the display 52 shown in FIG. 5. One possibility is that the PDA 40 be used as the display 52, in which case, the display 52 would be detachable from the system unit 53 and the camera attachment added. In addition, a GPS receiver would be built into camera attachment 42 to provide substantially the same functionality as the optional digital camera 57. In order to provide orientation information, the camera attachment 42 would additionally include a digital compass. If the PDA 40 is used as the display 52, it needs to be provided with the switch functions of the display. This can be most conveniently done in software to provide a display of switches performing those functions. Alternatively, the display 52 may be a specially designed PDA having all the functions of the PDA 40 plus the additional switch functions described.

FIGS. 5A and 5B show an alternative implementation to the portable self-contained electronic system are shown in FIG. 5. This implementation is a unitary structure based on an integrated PDA and cell phone technology, such as the Kyocera Smartphone™ which combines the functionality of the Palm™ PDA with a cell phone. The unit 58 has a front flip out panel 581 which, when closed, as shown in FIG. 5A, looks like a standard cell phone. This panel carries the standard cell phone keyboard and has a window 582 through which an LCD screen can be seen. The standard cell phone display functions can be viewed through this window 582. There is, in addition, the standard speaker 583 and microphone 582. When the flip out cover 581 is opened downwardly, as shown in FIG. 5B, the LCD screen 521 of the PDA is revealed. This is the same LCD screen 521 of the display 52 shown in FIG. 5. By integrating a GPS receiver into the unit and incorporating the function controls of the display 52 shown in FIG. 5, all of the functionality of the portable self-contained electronic system are shown in FIG. 5 can be achieved in this compact unit. Adding the digital camera accessory 42 shown in FIG. 4 completes the package. The only thing not incorporated into this unit is a CD/DVD drive and therefore downloads of the tours from the user's PC (FIG. 1) are generally required to use this unit.

Figure 6:
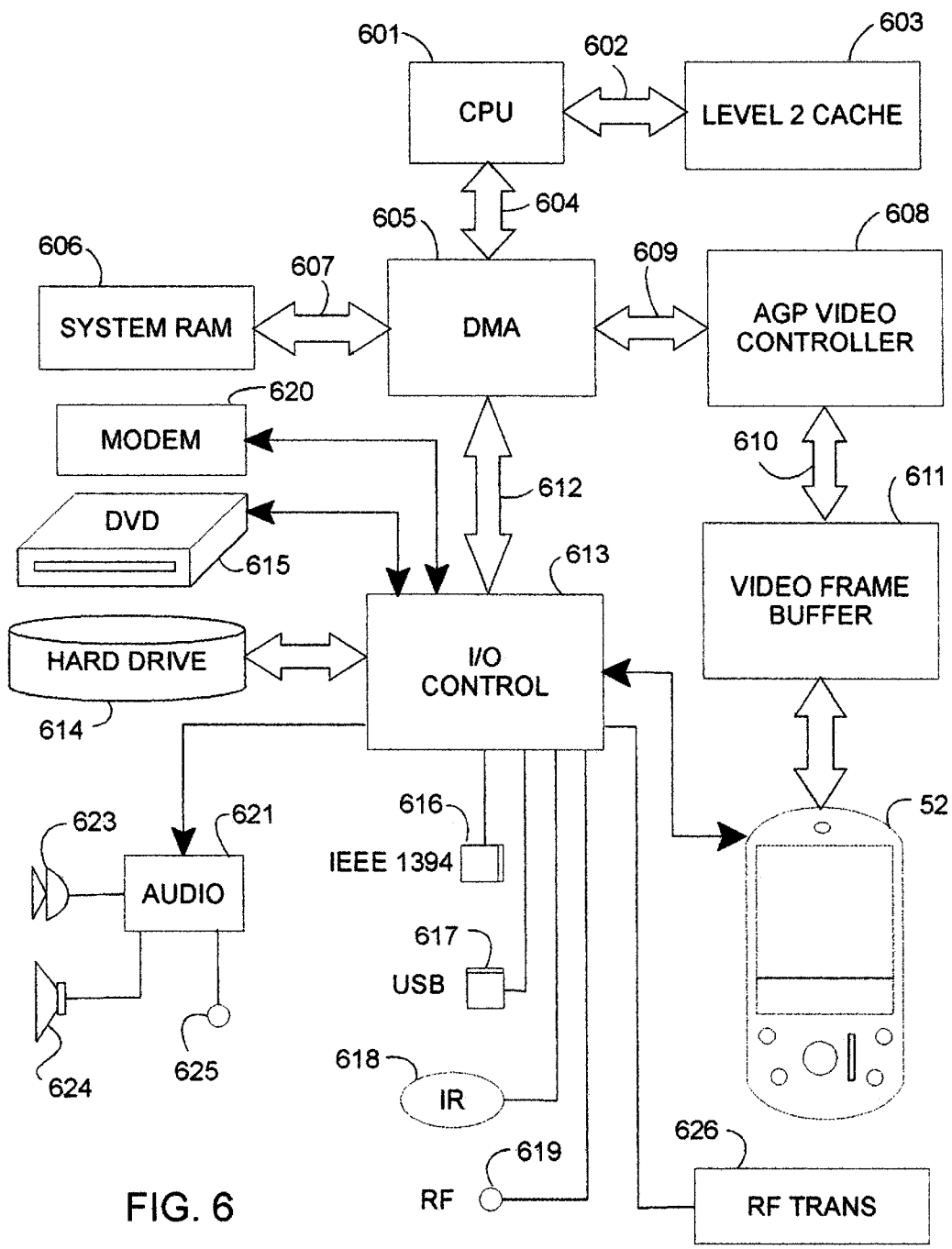
FIG. 6 is a block diagram of the computer architecture for the system unit of the portable self-contained electronic system implementing the interactive multimedia tour guide shown in FIG. 5.

The system unit 53 is shown in more detail in FIG. 6. The system unit includes a CPU 601 connected by a back-side bus 602 to a Level 2 cache RAM 603. The CPU 601 is also connected by a front-side bus 604 to a direct memory access (DMA) control chip 605 to which to which main system RAM 606 is connected by memory bus 607 and AGP video controller 608 is connected by AGP bus 609. The AGP video controller is connected to a video bus 610 which connects to the display 52 via a video frame buffer 611. The DMA control chip 605 is connected by a PCI (Peripheral Component Interconnect) bus 612 to an I/O control chip 613. The I/O control chip 613 supports an internal hard drive 614, a CD/DVD drive 615 and various ports, including an IEEE 1394 port 616, one or more USB ports 617, an IR port 618, and a wireless RF port 619, such as for the Bluetooth standard. One or the other of these ports may be used to provide a connection to the user's PC (FIG. 1) to download a selected tour to the hard drive 614 or a connection to the optional digital camera 57 for accessing the GIS database on hard drive 614 and/or CD/DVD drive 615 in order to identify subject(s) of digital video image(s) or video clip(s). Operating system (OS) software is installed on the hard drive 614. Voice recognition and speech synthesis software are also installed on the hard drive 614. The I/O control chip 613 additionally provides support for a modem 620 which connects to the wireless mobile telephone 44 and an audio chip 621 that connects to a microphone 623 and a speaker 624. The microphone 623 could be integrated into the display 52, and the speaker 624 could be integrated into the system unit 53. An audio jack 625 is provided in the system unit 53 in order to plug the optional headset 58 into the system unit. The jack 625 disables the integrated microphone and speaker when the headset 57 is plugged into the system unit. Optionally, a low power RE transmitter 626 may be used to transmit to a radio in an automobile in order to use the automobile's speaker system. The controls 522 to 526 on the display 52 are also connected to the I/O control chip 613. These controls 522 to 526 provide only minimal control functions since most of the computer/user interface is supported by the voice recognition software and speech synthesis software. The display 52 could additionally incorporate functions of a personal digital assistant (PDA) in which a stylus is used to access an address book, a reminder list, a calculator and the like from one or menus and to input written data using the handwriting recognition function of the PDA function. As mentioned, the display 52 could be the PDA 40 shown in FIG. 4.

Since it is contemplated that the interactive multimedia tour guide will be used in countries where the national language is not one in which the user is fluent, the interactive multimedia tour guide may include language translation software allowing the user not only to select a preferred language with which to communicate with the interactive multimedia tour guide but also to provide translations of words and phrases. This can be done in various ways. First, the user can speak the command "TRANSLATE INTO ENGLISH" or "TRANSLATE INTO SPANISH", for example, followed by the word or phrase to be translated. The translated word or phrase can be generated by the speech synthesis software and, optionally, displayed on the screen 521 of the display 52. Alternatively, if the display incorporates a PDA function, the word to be translated can be written with the stylus using the graffiti convention of the PDA function after first selecting a translate function and language from a menu displayed on the screen 521.

Figure 7:
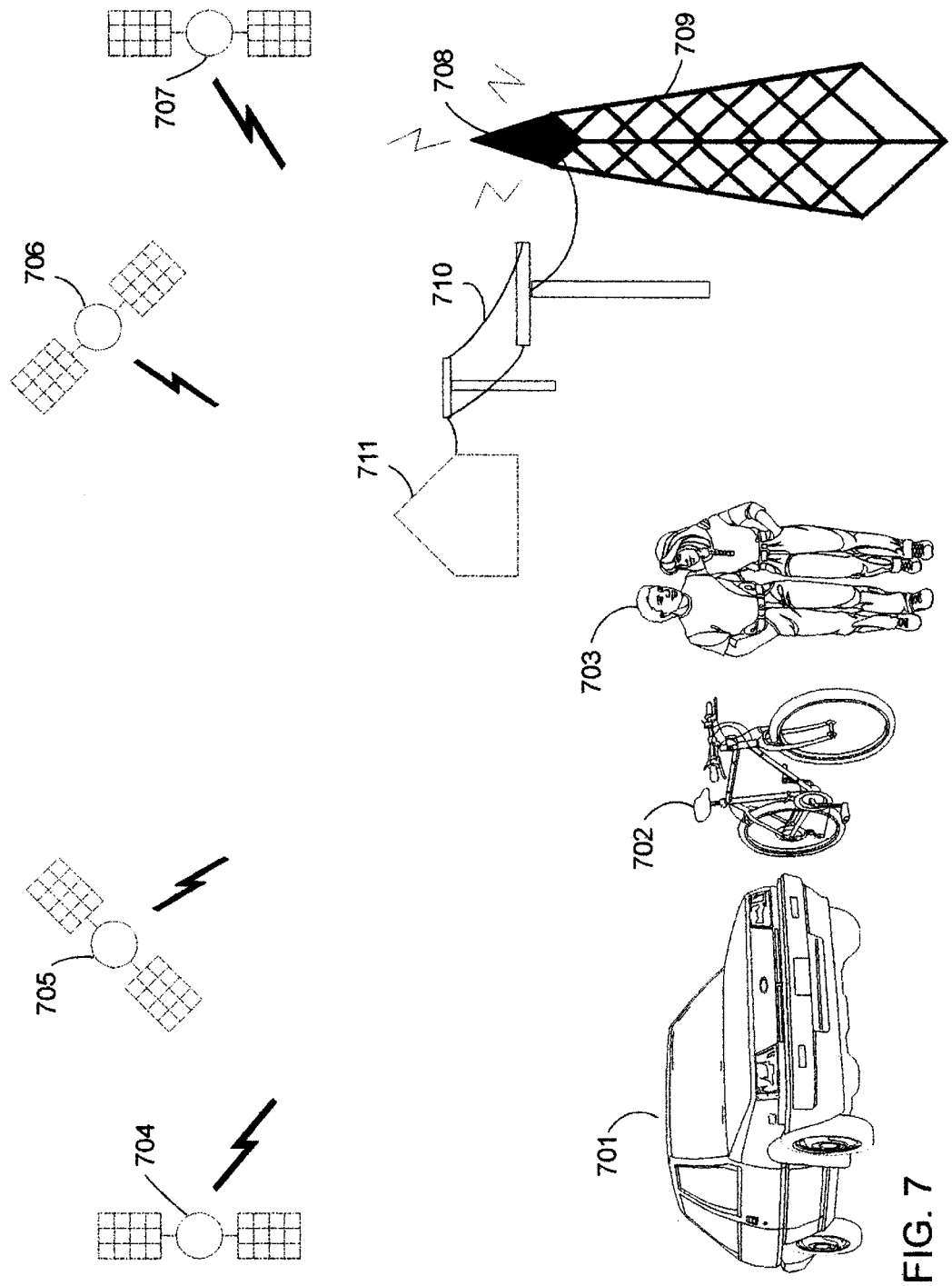
FIG. 7 is a pictorial diagram showing the relationship of the GPS system and a personal communication system to the portable self-contained electronic system of FIG. 4.

FIG. 7 illustrates the relationship of the portable self-contained electronic system implementing the interactive multimedia tour guide according to the invention with the GPS system and a wireless personal telephone communication service, such a cell phone. The portable self-contained electronic system can be used in an automobile 701, by a user on a bicycle 702, or by a user on foot 703. The GPS system comprises a constellation of twenty-four satellites, twenty-one active satellites plus three on-orbit spares, traveling around 12-hour circular orbits 10,898 nautical miles above the earth. Each satellite includes a feedback control loop to maintain continuous earth-seeking orientation for twelve navigation antennas and another feedback control loop to maintain a similar sun-seeking orientation for its two solar arrays. Each of the active satellites transmit accurate timing pulses and satellite ephemeris constants which are used by receivers to determine where the satellite was when it transmitted the timing pulses. To determine its position, a GPS receiver, such as receiver 51, measures the signal travel times associated with the binary pulse trains from four of the satellites, shown in FIG. 7 as satellites 704, 705, 706, and 707. The signal travel time multiplied by the speed of light equals the slant range from the satellite to the user. By measuring the instantaneous Doppler shift associated with those same four satellites, the receiver can also determine its three mutually orthogonal velocity components.

Cellular telephone systems have advanced from analog systems to digital systems, the latter implementing a code division, multiple access (CDMA) protocol which provides increased capacity. In a CDMA system, the propagation of a wideband carrier signal is used. Wideband signal transmission also offers the advantages of reducing fade and avoidance of jamming. The Federal Communications Commission (FCC) issued a Notice of Inquire (NOI) in 1991 into how to develop and implement a new personal communications service (PCS). This may lead to yet more advanced mobile telephone communications systems. One area being developed is a land-mobile-to-satellite communications system which has the advantage of not requiring an array of land-based base transceivers but with the disadvantages associated with satellite communications, including relatively high-powered mobile transceivers. The present invention contemplates the use of a wireless mobile telephone 54, and current technology in widest use is the cellular telephone system. In such a system, the telephone 54 communicates with one or more transceivers 708 mounted on towers 709, each of these transceivers providing coverage within a cell and connecting calls to land lines 710 to telephone exchange offices 711. The specific technologies used either for determination of location (e.g., the GPS system) or communication (e.g., a cellular telephone system) are not critical to the practice of the invention. These current technologies, however, represent the preferred technological environment in which to practice the invention.

Figure 8A:
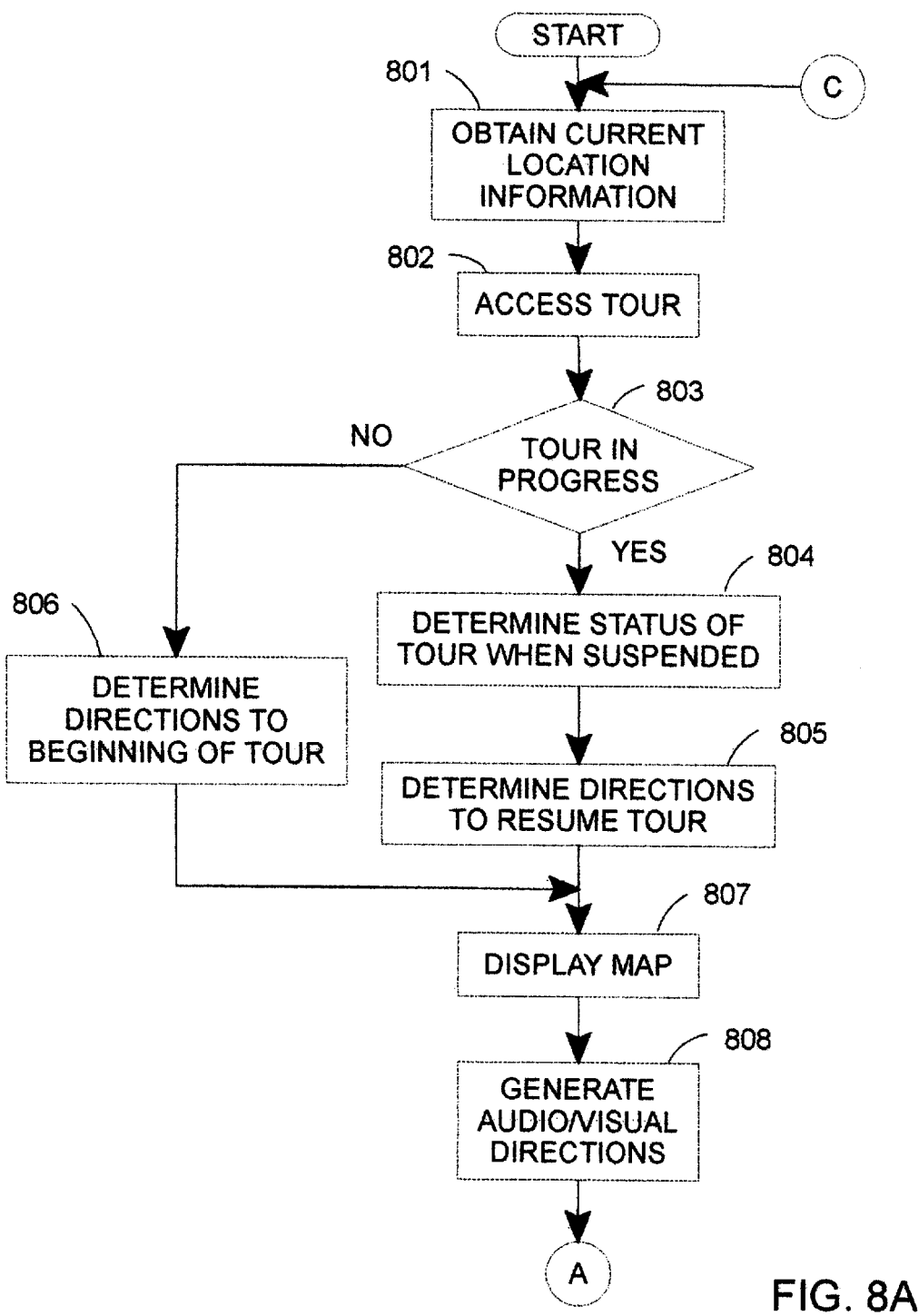
FIGS. 8A to 8C, taken together, form a flow diagram showing the logic of the process of taking a selected and/or customized tour which has been stored in or downloaded to the portable self-contained electronic system shown in FIG. 6.
Figure 8B:
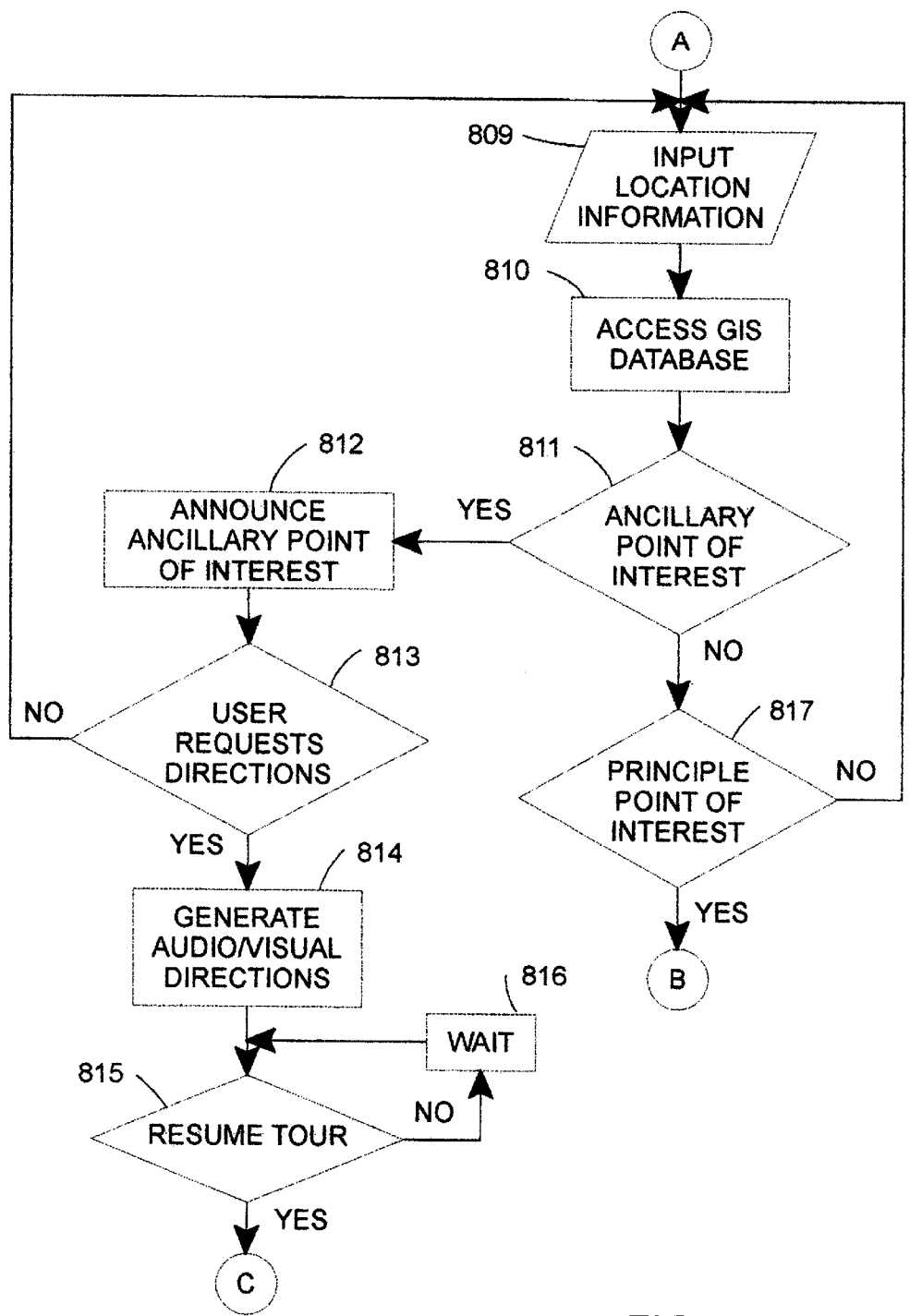
Figure 8C:
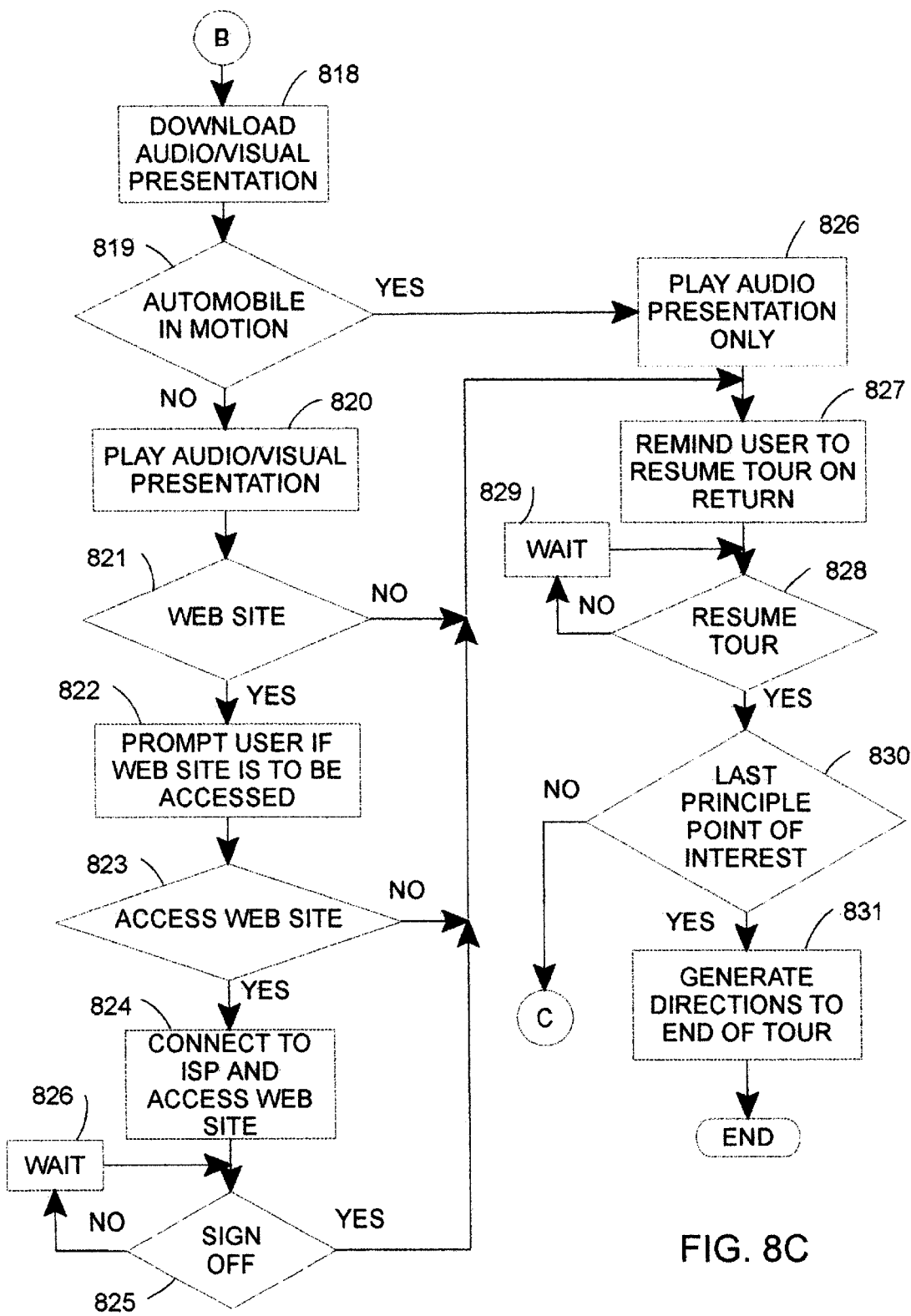

Turning now to FIGS. 8A to 8C, the flow diagram illustrates the process of taking a selected tour which has been down loaded from the user's personal computer (FIG. 1) to the portable self-contained electronic system (FIGS. 5 or 5A) or, in the alternative, taking a tour generated directly on the portable self-contained electronic system, implementing the interactive multimedia tour guide according to the invention. The process begins in FIG. 8A by obtaining the current location from the GPS receiver 51 in function block 801. This might be initiated automatically upon power on and/or pressing the location switch 522 on the display 52. There typically is a short period of time for the acquisition of signals from four GPS satellites (FIG. 7), but when these signals are acquired, the current location of the GPS receiver, and hence the user, is quickly computed. The tour stored on the hard drive 613 is accessed in function block 802. A determination is made in decision block 803 as to whether there is a current tour in progress. For example, if during a tour the user decides to stop to have lunch or independently explore an area not part of the selected tour, the user may turn off the portable self-contained electronic system implementing the interactive multimedia tour guide according to the invention. As part of the power down process, the system stores the current status of the tour so that it may be later resumed. If there is a current tour in progress, as determined in decision block 803, the status of the tour at the time it was suspended is accessed in function block 804, and the user's current location is used in function block 805 to determine directions to resume the tour. If this is the beginning of the selected tour, again as determined in decision block 803, the user's current location is used to determine in function block 806 directions to the beginning of the tour.

Once the user's current location is determined, a map showing the user's location relative to the first or next point of interest in the tour is displayed in function block 807. The user can use the zoom in/out wheel 525 to zoom in and out in the displayed map and can use the roller ball 526 to scroll the map vertically and horizontally. Alternatively, the user can voice the commands "ZOOM" or "PAN" followed by the direction to accomplish the same purpose, such as "ZOOM RV" or "ZOOM OUT" and "PAN RIGHT" or "PAN UP", etc. Ordinarily, this will not be necessary, at least for the initial map display. The directions are provided in audio/visual form in function block 808. The audio form of the directions are verbal directions generated by the speech synthesis program triggered by location and proximity to a turn or landmark. The visual directions, in addition to the displayed map, are in the form of an arrow pointing up for straight ahead or left or right, indicating a turn at the next intersection.

Along the route to the next principle point of interest, the user's current location is constantly being updated by information from the GPS receiver 51. This is shown at input block 809 in FIG. 8B. The location information is used in function block 810 to access the GIS database downloaded from the user's personal computer for the selected tour or stored on the portable self-contained system of FIG. 5. This database includes the custom set of ancillary points of interest generated using the composite preference mask. The user's approach to one of these ancillary points of interest will be detected in decision block 811 which triggers the speech synthesis software with text to speech module to generate an audible description of the ancillary point of interest in function block 812. If the user finds the ancillary point of interest of more than passing interest and feels that he or she has the time to deviate from the main tour, the user may want to visit this point of interest. The user may voice the command "DIRECTIONS". If that command is voiced, as determined in decision block 813, the system accesses the GIS database to determine the directions to this ancillary point of interest and provides the directions in audio/visual form in function block 814. After visiting the ancillary point of interest, the user may then voice the command "RESUME TOUR". This command is detected in decision block 815 and, until the command is detected, the system waits in function block 816. When the "RESUME TOUR" command is detected in decision block 815, the process loops back to function block 801 in FIG. 8A, and the system then provides the directions in audio/visual form in function block 808 to get back to the main tour.

If an ancillary point of interest is not detected in decision block 811, a determination is made in decision block 817 as to whether a principle point of interest is close. If not, the process loops back to input block 809. On approach to a principle point of interest on the selected tour, as determined by location information provide by the GPS receiver 51 and detected in decision block 817, the process goes to function block 818 in FIG. 8C where system accesses the database to generate an audio/video presentation for the principle point of interest. The audio/visual presentation provides the user with a preview of what he or she is about to experience. The visual presentation, which may include video clips, can be inhibited while the automobile is in motion. A determination is made in decision block 819 as to whether the automobile is in motion (assuming that the portable electronic system of FIG. 5 is in an automobile). The GPS receiver 51 determines, from Doppler frequency shifts, velocity components as well as location coordinates. If the automobile is not in motion, the audio/visual presentation is played in function block 820. The GIS database is accessed for the principle point of interest to determine if this point of interest has a Web site. If so, as determined in decision block 821, the user will be asked in function block 822 whether he or she wishes to access the Web site as part of his or her preview of the point of interest. If the user's response is YES, as determined in decision block 823, the system activates the modem 517 and dials the user's ISP through the wireless mobile telephone 54. Depending on where the tour is relative to the user's home, it may be necessary to include in the downloaded database local phone numbers in the vicinity of the tour in order to access the user's ISP using a local number. Once a connection is made, the principle point of interest's URL is input in function block 824 to access the Web site. The roller ball 526 on the display 52 may be used to navigate the Web site. When the user has finished viewing the Web site, the user may voice the command "SIGN OFF". When this command is detected, as determined in decision block 825, the system logs off and disconnects from the Internet; however, until that command is voiced, the system waits in function block 826.

If the automobile is in motion, as determined in decision block 819, only the audio portion of the audio/visual presentation is presented in function block 826. Moreover, there is no access to the principle point of interest's Web site, if any. After making the audio/visual presentation and optionally accessing the Web site, if any, or after playing only the audio portion of the presentation, the process reminds the user to resume the tour on return and then enters a suspended operation. While in this suspended operation, a check is made in decision block 828 as to whether the user has voiced the command "RESUME TOUR". If not, the process continues to wait in function block 829. However, when the "RESUME TOUR" command is detected in decision block 828, a further test is made in decision block 830 to determine if the last principle point of interest for the current selected tour has been visited. If not, the process returns to function block 801 in FIG. 8A and the main process flow. If the last point of interest of the current selected tour has been visited, directions to the end of the tour are generated in function block 831 before the process ends. The end of the tour may be the user's home, a bed-and-breakfast, etc.

Figure 9A:
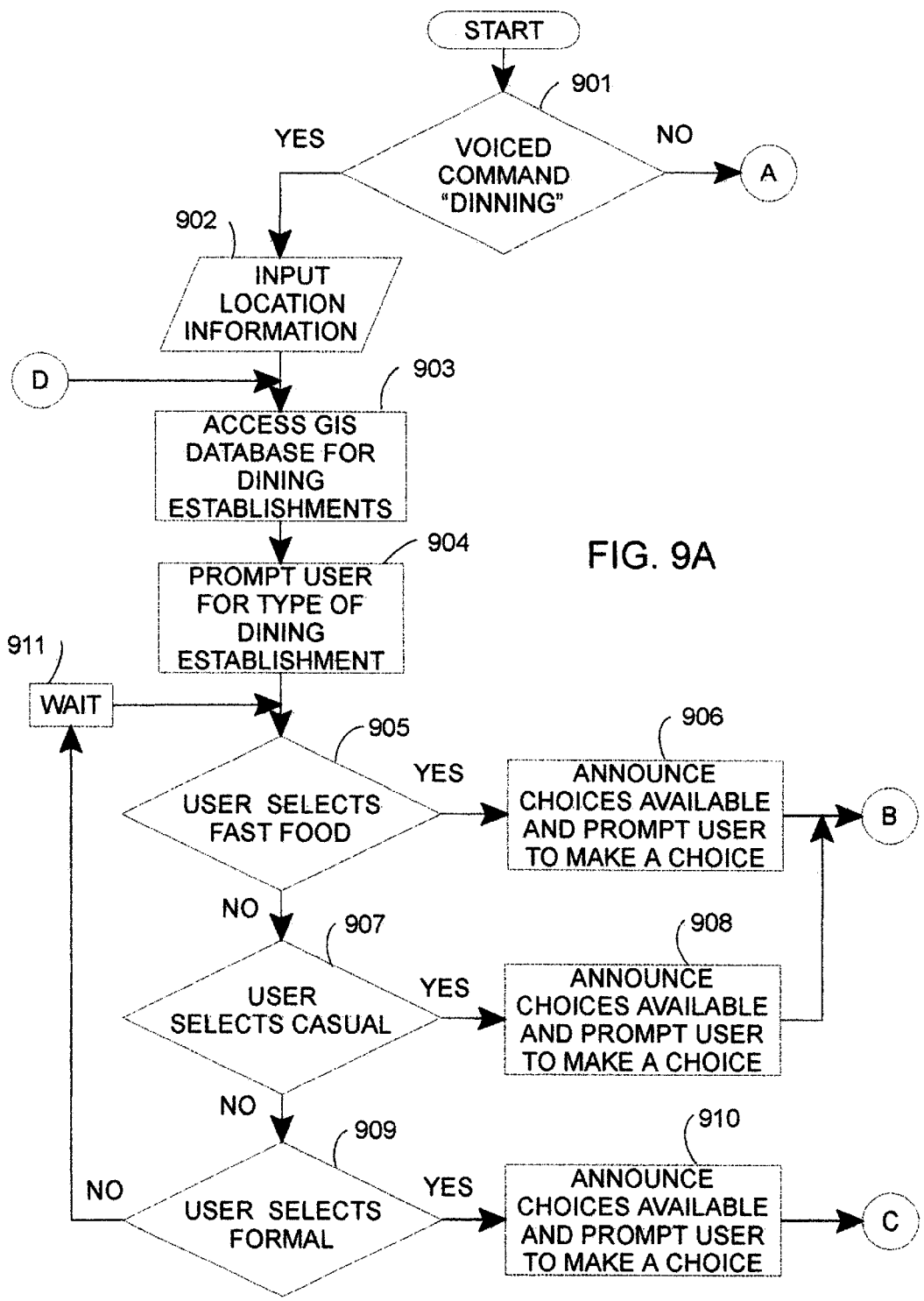
FIGS. 9A to 9D, taken together, form a flow diagram showing the logic of the process for finding suitable dining and lodging while taking a selected tour.

If at any time during the tour the user would like to deviate from the tour, such as find a nice inn or restaurant for lunch or dinner or perhaps locate lodging at a bed-and-breakfast or motor lodge or perhaps a campground, this can be accomplished by the process shown in FIGS. 9A to 9D. Referring first to FIG. 9A, should the user voice the command "DINING"(or like command, such as "FOOD"), as detected in decision block 901, the system uses the current location as provided by the GPS receiver 51 in input box 902 to access the database to determine in function block 903 the closest dining facilities. These may be of different categories from fast food to haute cuisine, depending on the custom set of ancillary points of interest generated by the composite preference mask. If there are different categories, the system prompts the user to select a category in function block 904. The categories might be "fast food", "casual" or "formal" and these categories are spoken by the speech synthesis software as, "Do you want fast food, casual or formal?" The user responds by voicing one of the categories. A determination is made in decision block 905 whether the user's response is fast food. If so, the choices, if any, of fast food establishments are announced in function block 906; otherwise, a determination is made in decision block 907 whether the user's response is casual. If so, the choices, if any, of casual dining establishments are announced in function block 908; otherwise, a determination is made in decision block 909 whether the user's response is formal. If so, the choices, if any, of formal dining establishments are announced in function block 910; otherwise, the process waits in function block 911 before looping back to decision block 905 to await the user's response. In each of function blocks 906, 908 and 910, the user is prompted to make a choice if any are provided.

Figure 9B:
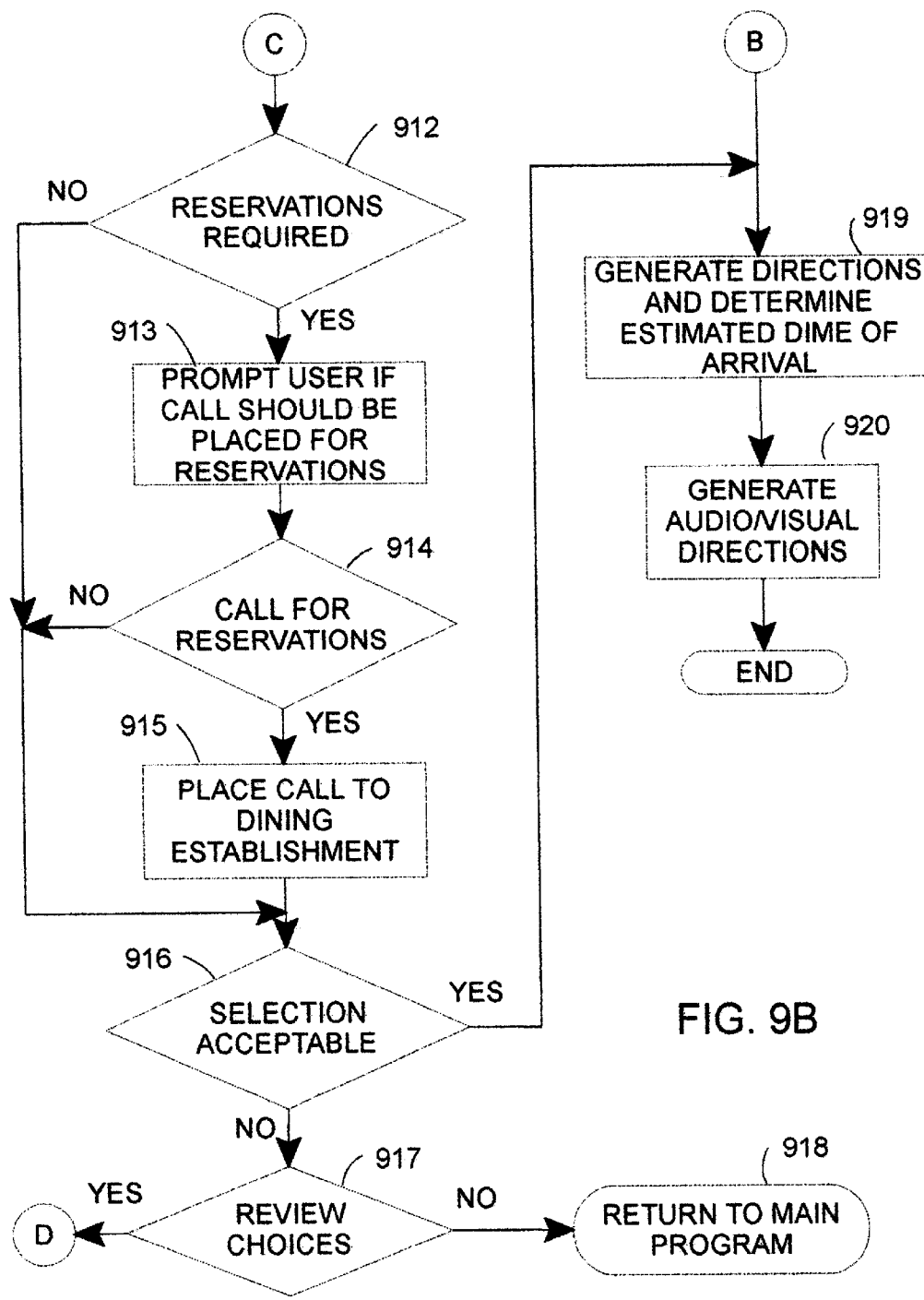

Referring now to FIG. 9B, and assuming first that the user has chosen a formal dining establishment, the database is checked in decision block 912 to determine if reservations are required or recommended. If so, the user is prompted in function block 913 of the requirement and asked whether a call should be placed to the establishment. If the user voices the command "CALL", as determined in decision block 914, the system accesses the establishment's telephone number from the database and dials the telephone 54 in function block 915. Once the connection is made, the user can identify himself or herself and make the necessary reservations. If reservations are not required, as determined in decision block 912, or the user declines to call for reservations, as determined in decision block 914, or after the call is made, a determination is next made in decision block 916 as to whether the selection is acceptable. For one reason or another, the user may decide that the selection is not acceptable, perhaps he or she may not have been able to obtain reservations. The user is given the option in decision block 917 to review the choices. If the user chooses this option, the process loops back to function block 903 in FIG. 9A. However, should the user not find the selection acceptable and does not choose to review the choices, a return is made to the main program in return block 918. If the selection is acceptable, as determined in decision block 916, or a choice of a fast food establishment is made in response to the prompt in function block 906 or a choice of a casual food establishment is made in response to the prompt in function block 908, directions to the selected dining establishment are generated in function block 919 along with an estimated time of arrival. The audio/visual directions are generated in function block 920. Upon arrival at the dining establishment, the process ends or suspends.

Figure 9C:
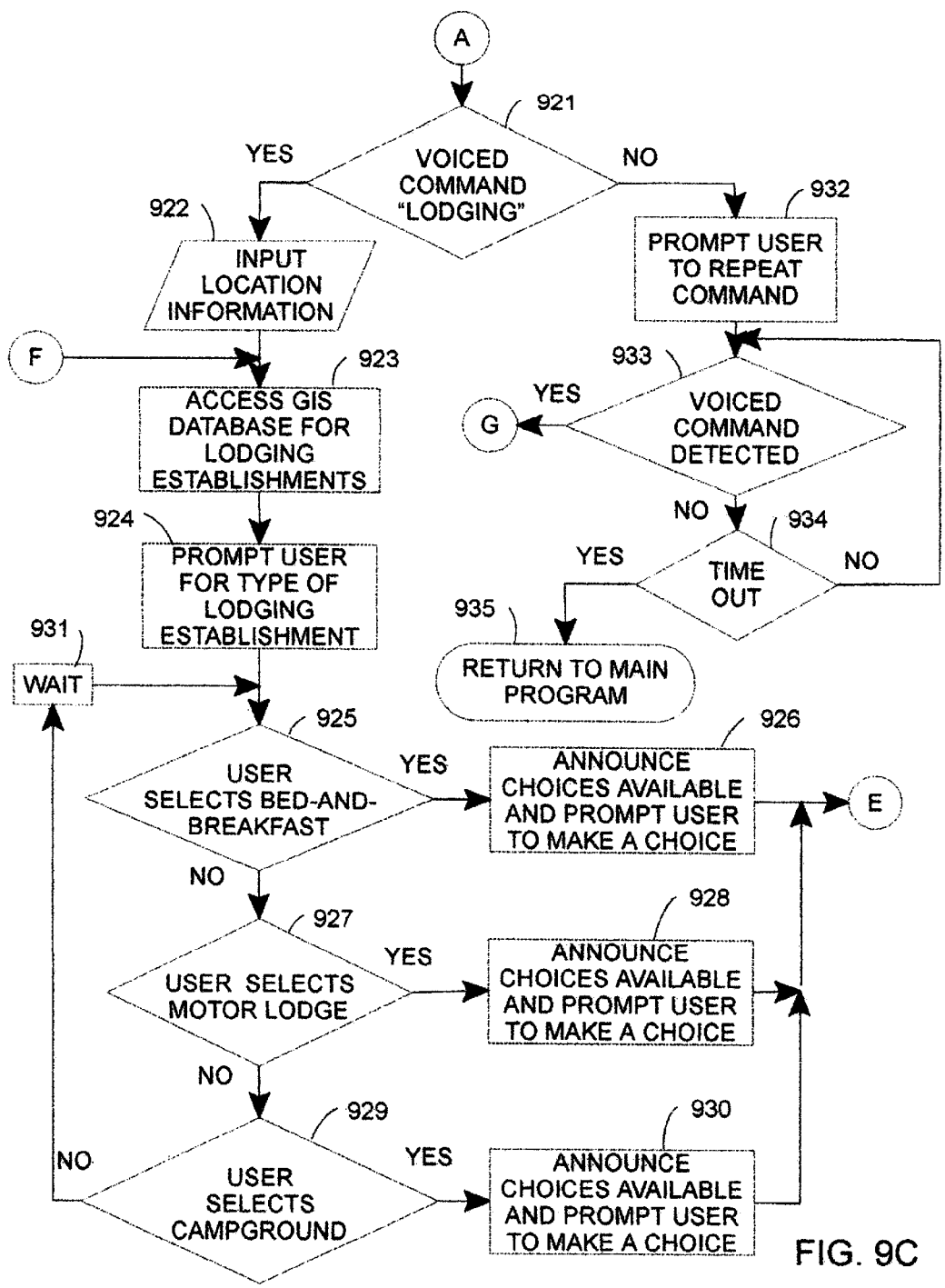

If the voiced command detected is not "DINING" as determined in decision block 901 in FIG. 9A, the process goes to decision block 921 in FIG. 9C where a determination is made as to whether the voiced command is "LODGING". If so, the system uses the current location as provided by the GPS receiver 51 in input box 922 to access the database to determine in function block 923 the closest lodging facilities. These may be of different categories from rustic to luxurious, depending on the custom set of ancillary points of interest generated by the composite preference mask. If there are different categories, the system prompts the user to select a category in function block 924. The categories might be "bed-and-breakfast" "motor lodge" or "campground" and these categories are spoken by the speech synthesis software as, "Do you want bed-and-breakfast, motor lodge or campground?" The user responds by voicing one of the categories. A determination is made in decision block 925 whether the user's response is bed-and-breakfast. If so, the choices, if any, of bed-and-breakfast establishments are announced in function block 926; otherwise, a determination is made in decision block 927 whether the user's response is motor lodge. If so, the choices, if any, of motor lodges are announced in function block 928; otherwise, a determination is made in decision block 929 whether the user's response is campground. If so, the choices, if any, of campgrounds are announced in function block 930; otherwise, the process waits in function block 931 before looping back to decision block 925 to await the user's response. In each of function blocks 926, 928 and 930, the user is prompted to make a choice if any are provided.

Figure 9D:
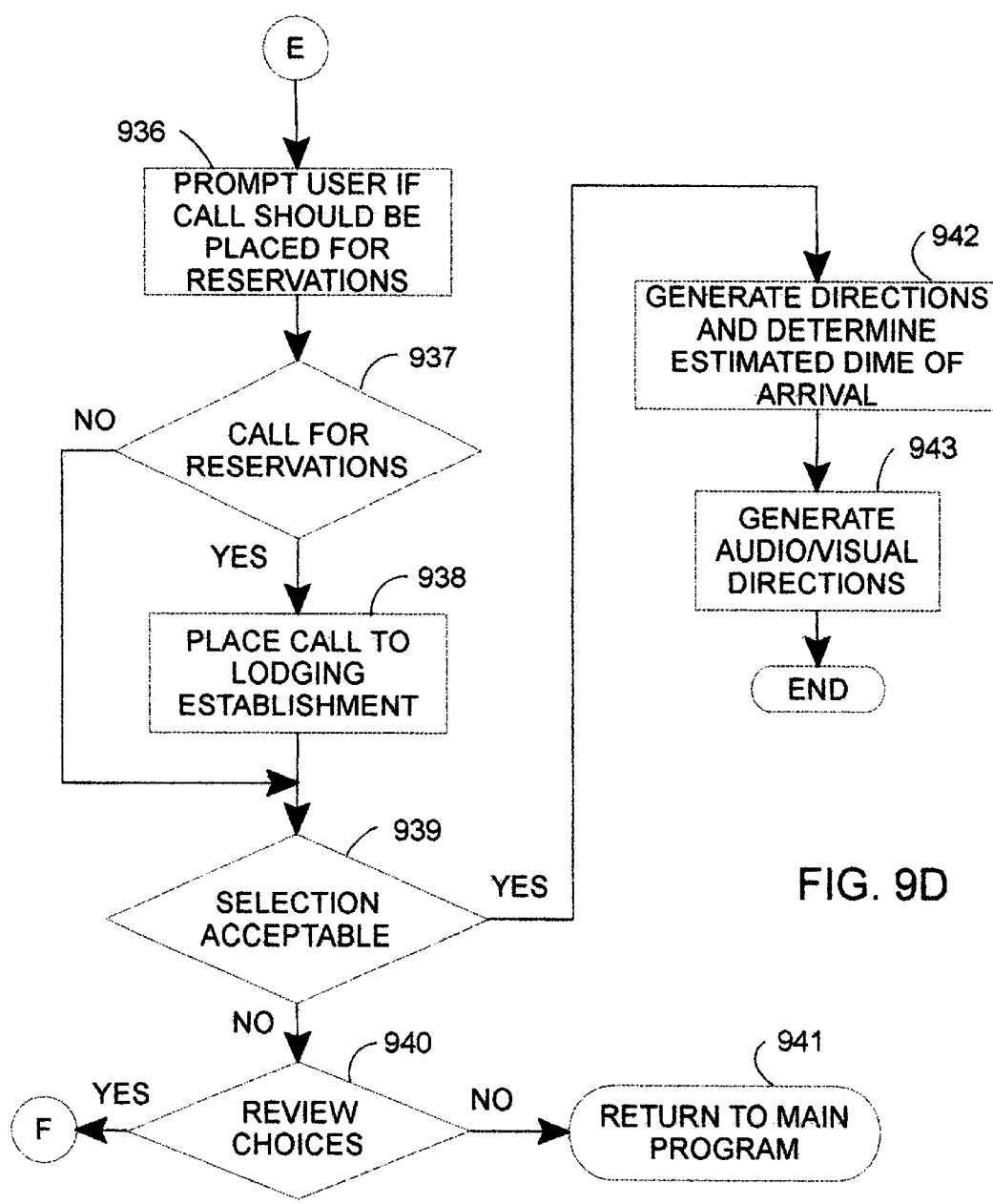

Referring now to FIG. 9D, the user is asked in function block 936 whether a call should be placed to the establishment to make reservations. If the user voices the command "CALL", as determined in decision block 937, the system accesses the establishment's telephone number from the database and dials the telephone 54 in function block 938. Once the connection is made, the user can identify himself or herself and make the necessary reservations. If the user declines to call for reservations, as determined in decision block 937, or after the call is made, a determination is next made in decision block 939 as to whether the selection is acceptable. For one reason or another, the user may decide that the selection is not acceptable, perhaps he or she may not have been able to obtain reservations. The user is given the option in decision block 940 to review the choices. If the user chooses this option, the process loops back to function block 923 in FIG. 9C. However, should the user not find the selection acceptable and does not choose to review the choices, a return is made to the main program in return block 941. If the selection is acceptable, as determined in decision block 939, directions to the selected lodging establishment are generated in function block 942 along with an estimated time of arrival. The audio/visual directions are generated in function block 943. Upon arrival at the lodging establishment, the process ends or suspends.

FIGS. 10A to 10D, taken together, show the flow diagram of the process implemented for the optional digital camera 57 (FIG. 5) or the camera accessory 42 (FIG. 4) if used on the system shown in FIG. 5A. In the this process, the camera, which may be either a still camera or a video camera, can be either in communication with the system unit 53 (FIG. 5) or not. In the former case, identification and description information is contemporarily stored with the images or video clips, whereas in the latter case, identification and description information is added in a later process with the system unit. While communication between the camera 57 and the system unit 53 can be accomplished by means of a cable connection, this is generally not desirable. In the preferred embodiment, a wireless connection between the camera 57 and the system unit 53 is made using, for example, the Bluetooth standard. The particular wireless standard used, however, is not critical to the practice of the invention. Typically, the camera 57 will be in communication with the system unit 53 when the user is a pedestrian or bicyclist wearing the carrying case 56 as a backpack or fannypack. In this situation, the camera 57 and the system unit 53 will be in close proximity, facilitating the wireless communication link between the two. If the portable electronic system is being used in an automobile, the portable electronic system will remain in the automobile while pictures are being taken and, depending on the distance of the camera 57 from the system unit 53, the camera 57 may lose its communication link with the system unit 53. The camera 57 includes a calendar/clock which is used to date and time stamp digital image(s) or video clips. In addition, the camera 57 is preferably equipped with its own GPS receiver so that location information can be stored with digital image(s) or video clips. In other words, the camera 57 does not have to rely on the location information from GPS receiver 51, which is important if the communication link between the camera 57 and the system unit 53 is broken. One additional piece of information. is also required for one feature of the invention and that is orientation information. For this, the digital camera is equipped with a digital magnetic compass. Thus, when pictures or video clips are taken with the camera, information on the orientation of the camera is also stored with the digital image(s) or video clips. If the optional implementation shown in FIG. 5A is used, a communication link will always be maintained since the units are integral.

Figure 10A:
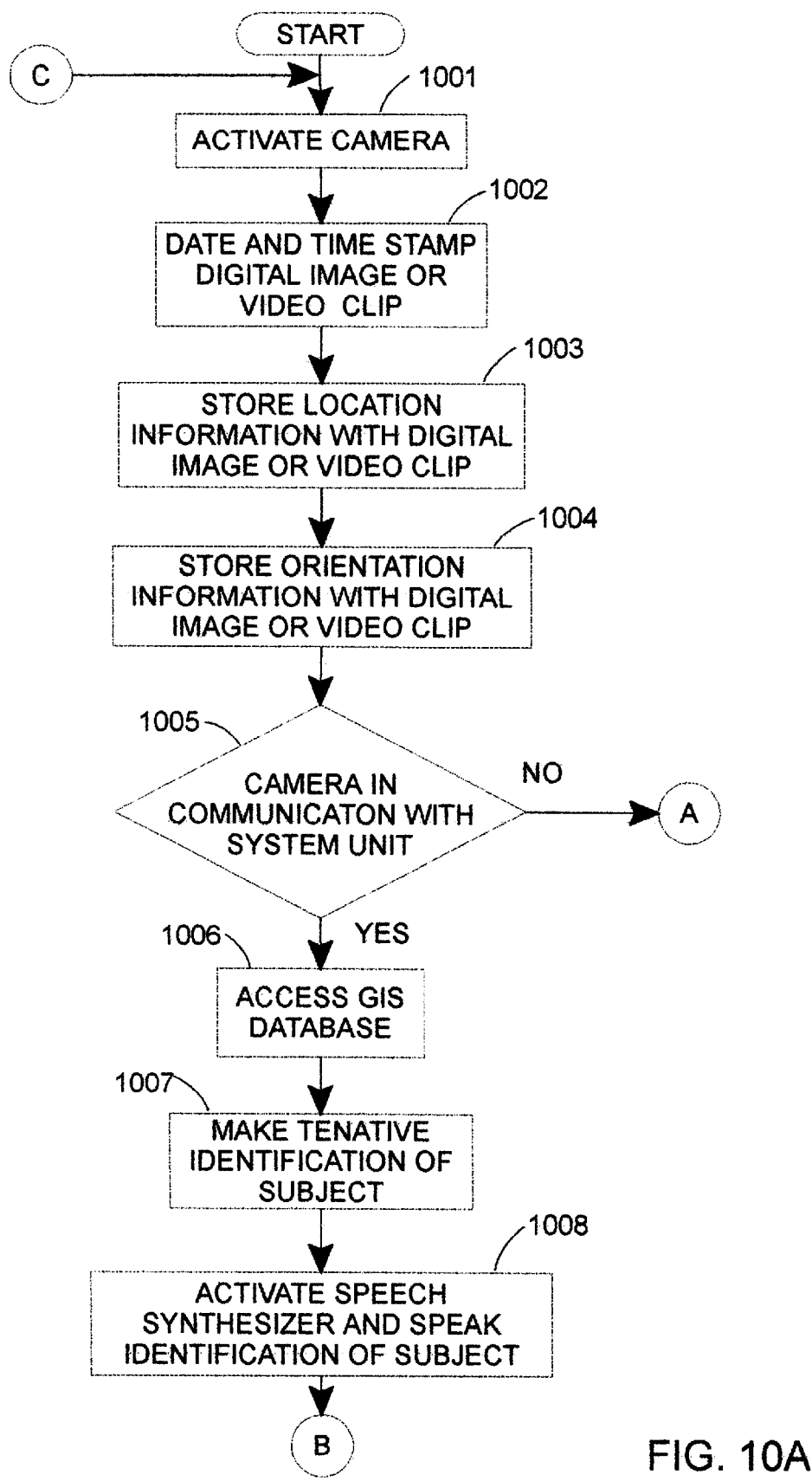
FIGS. 10A to 10D, taken together, form a flow diagram showing the logic of the process for date, time, location, and orientation stamping pictures and videos as well as adding an identification and description of the subjects of the pictures and videos.

Referring first to FIG. 10A, the process begins in function block 1001 when the camera is activated. As the camera is activated, either by releasing the shutter if a still camera or by triggering the camera on if a video camera, date and time information are automatically stored with the digital image(s) in function block 1002. Location information is also available from the camera's GPS receiver, and this information is also stored with the digital image(s) in function block 1003. In many cases, this location information is enough to make an accurate determination of the subject of the picture or video clip, but additional information is often required to make a more accurate determination and that is supplied by orientation information. This information is supplied by the built-in digital compass in the camera. The orientation of the camera is therefore recorded with the digital image(s) in function block 1004. A determination is made in decision block 1005 as to whether the camera is currently in communication with the system unit. If not, the process goes to FIG. 10C, described below. However, if the camera is currently in communication with the system unit, the GIS database stored on the hard drive of the system unit 53 is accessed in function block 1006, and a tentative determination of the likely subject of the digital image(s) or video clip is made in function block 1007. This system then activates the speech synthesizer and audibly announces to the user the subject tentatively determined in function block 1008.

Figure 10B:
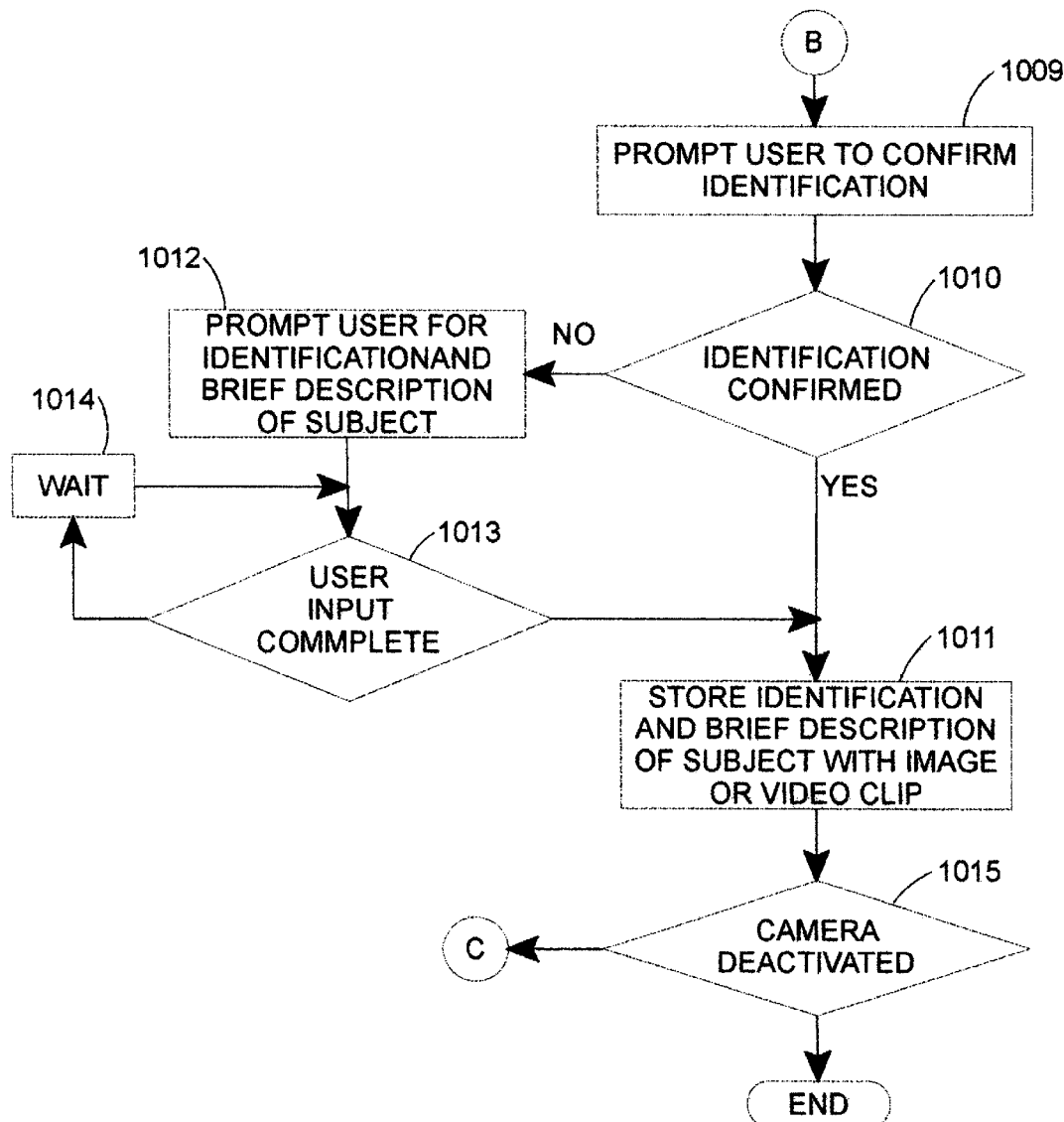

The process next goes to FIG. 10B where the user is prompted for confirmation of the tentative identification of the subject of the digital image or video clip in function block 1009. The user confirms by voicing "OK" or declines to confirm by voicing "NO". If the user voices "OK", as determined in decision block 1010, the subject information, including a brief description stored in the GIS database, is stored with the digital image(s) or video clip in function block 1011 along with the date, time, location and orientation information. However, should the user decline to confirm the determined subject, the user is audibly prompted to provide a verbal identification and brief description of the subject in function block 1012. A determination is made in decision block 1013 as to whether the user has supplied the identification and description information and, if not, the process waits in function block 1014. When the user has finished speaking the identification and description information, as determined in decision block 1013, the user supplied identification and description information is stored with the digital image(s) in function block 1011. Next, a determination is made in decision block 1015 as to whether the user has turned the camera off If so, the process ends; otherwise, the process loops back to function block 1001 in FIG. 10A to await the next activation of the camera.

Figure 10C:
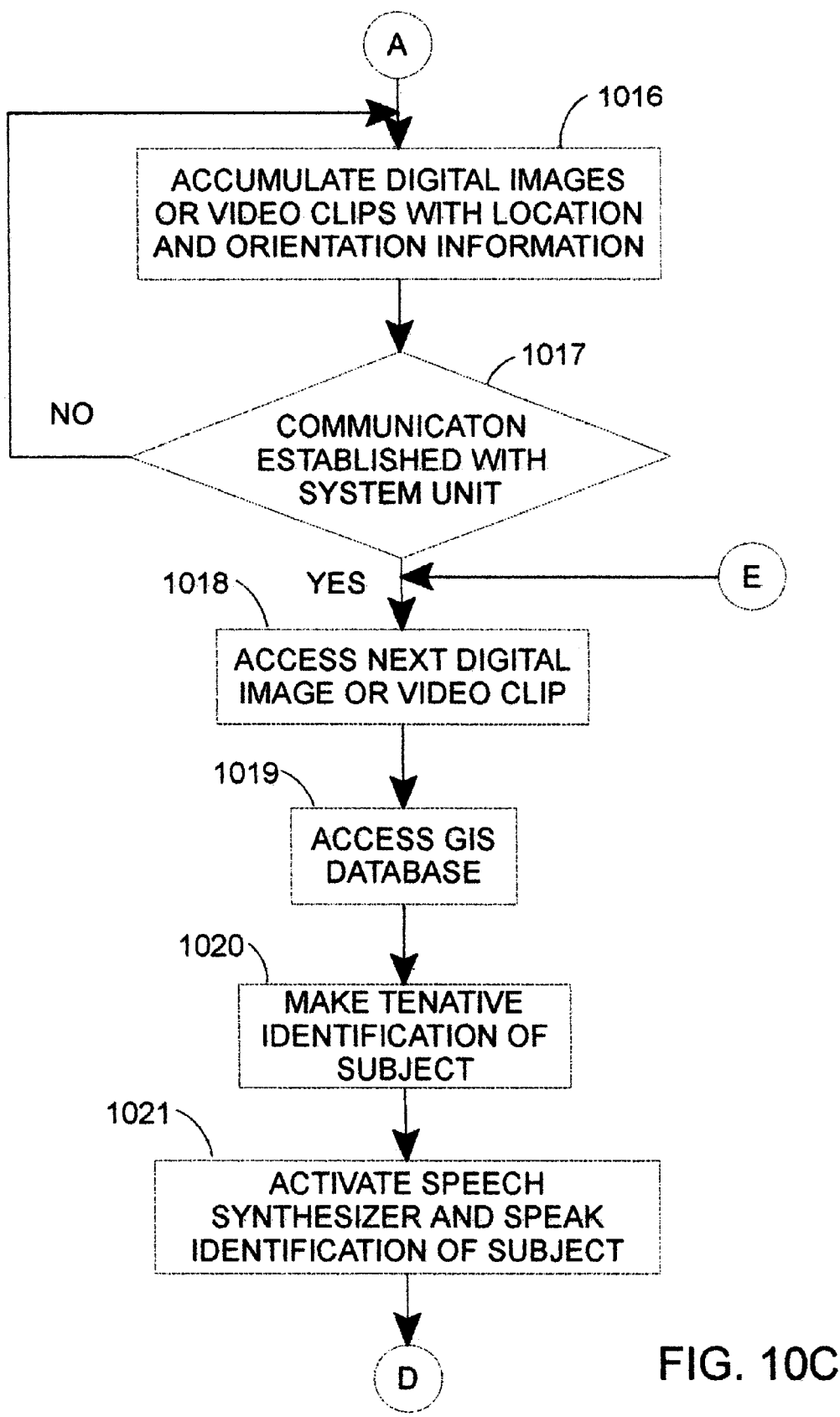

Assuming next that the camera 57 is not currently in communication with the system unit 53, as detected in decision block 1005 in FIG. 10A, the process goes to function block 1016 in FIG. 10C where digital images or video clips are accumulated with location and orientation information. A determination is made in decision block 1017 as to whether communication has been reestablished with the system unit and, if not, the process loops back to function block 1016 to continue accumulating digital images or video clips. However, once communication is re-established it is possible to access the GIS database on the hard drive of the system unit. The next step in the process in function block 1018 is to access the next digital image or video clip in the order accumulated in function block 1016. The GIS database is accessed in function block using the location and orientation information stored with the digital image or video clip in function block 1019 to identify the probable subject of the digital image or video clip. A tentative identification of the subject is made in function block 1020. The system then activates the speech synthesizer and audibly announces to the user the first subject determined in function block 1021.

Figure 10D:
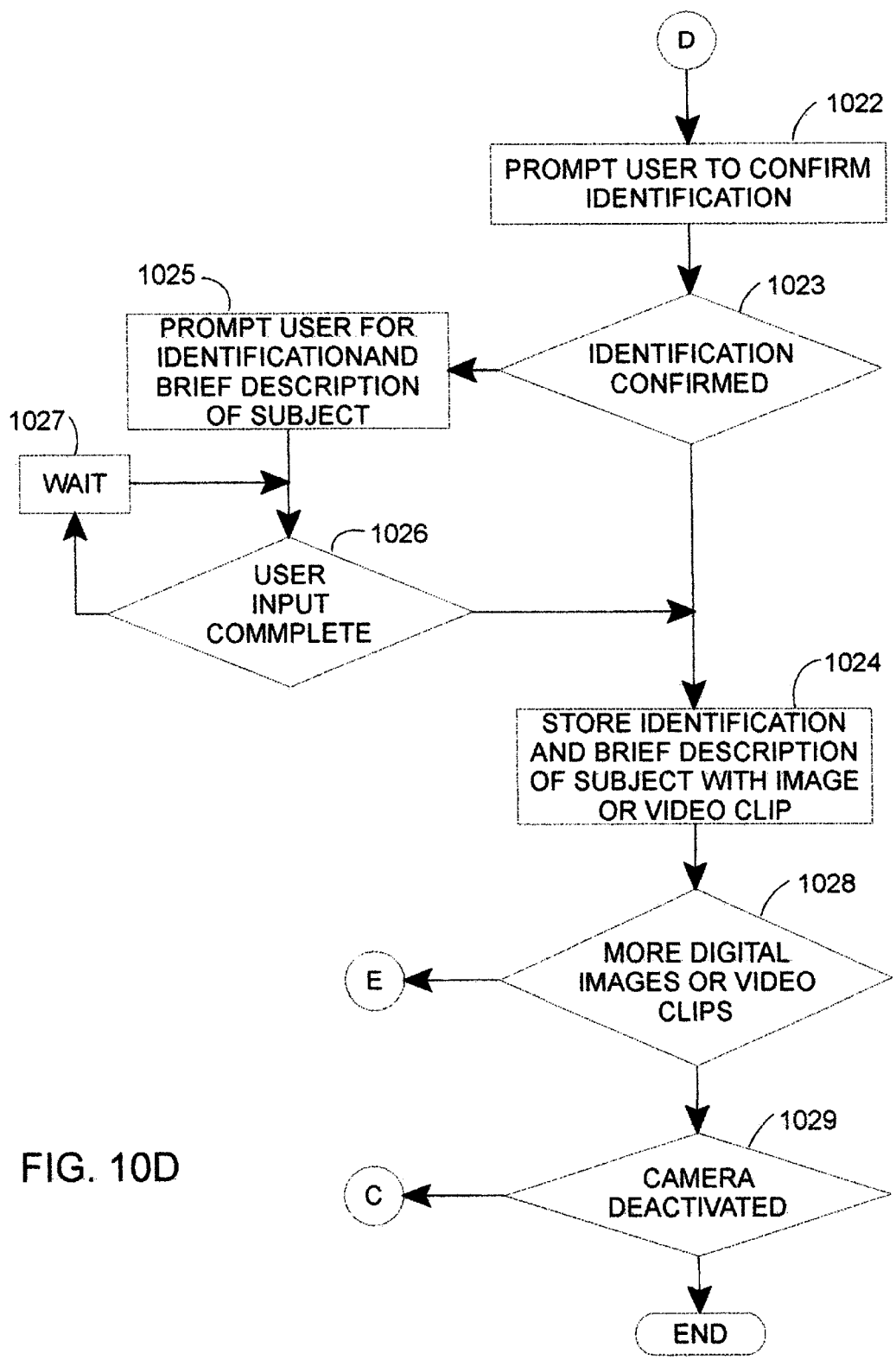

The process next goes to function block 1022 in FIG. 10D where the user is prompted for confirmation. The user confirms by voicing "OK" or declines to confirm by voicing "NO". If the user voices "OK", as determined in decision block 1023, the subject information, including a brief description stored in the GIS database, is stored with the digital image or video clip in function block 1024 along with the date, time, location and orientation information. However, should the user decline to confirm the determined subject, the user is audibly prompted to provide a verbal identification and brief description of the subject in function block 1025. A determination is made in decision block 1026 as to whether the user has supplied the identification and description information and, if not, the process waits in function block 1027. When the user has finished speaking the identification and description information, as determined in decision block 1026, the user supplied identification and description information is stored with the digital image(s) in function block 1024. A determination is then made in decision block 1028 as to whether all digital image(s) or video clip(s) have been processed. If not, the process loops back to function block 1018 in FIG. 10C to process the next digital image or video clip. When all digital image(s) or video clip(s) have been processed, a determination is made in decision block 1029 as to whether the user has turned the camera off and, if so, the process ends; otherwise, the process loops back to function block 1001 in FIG. 10A.

In alternative embodiments, the digital camera may not have a built-in GPS receiver and may instead rely on the GPS receiver 51, but this can only be done when the camera is attached to the system unit 53. While it is preferable to provide contemporary identification of the subjects of digital images or video clips which are fresh in the user's memory, the user may be given the opportunity to delay the identification process until sometime later, if it is more convenient to do so. The digital image(s) can be stored internally in the camera using the camera's internal memory device (memory stick, tape, etc.) or uploaded to the hard drive in the system unit 53. Once the user has returned home for his or her tour, it now becomes an easy matter to upload the stored images and/or video clips to the user's PC for purposes of archiving and presentation. A link can be provided for standard video editing software, such as Adobe Premiere™ video editing software, to provide date, time and identification information for images and video clips.

While the invention has been described in terms of preferred embodiments, those skilled in the art will recognize that the invention can be practiced with modification within the spirit and scope of the appended claims. In particular, it will be recognized that the preferred embodiments may, with improvements in technology, be modified to be more compact, capable of storing larger databases and including more integrated functions.

Having thus described my invention, what I claim as new and desire to secure by Letters Patent is as follows:

1. An interactive multimedia tour guide comprising:
   a Geographic Information System (GIS) database of packaged tours from which a user may select a tour, each tour being comprised of principle points of interest and ancillary points of interest, the ancillary points of interest not being the primary subject of a particular tour; and
   a portable self-contained system including a Global Positioning Satellite (GPS) receiver and means for storing at least a selected tour and related information from the GIS database, the portable self-contained system further including a speech synthesis function to provide audible directions and information about points of interest as a tour progresses and audible prompts to the user, the GPS receiver generating location information used to access information in the selected tour, the interactive multimedia tour guide allowing the user to modify the selected tour while in progress.

2. The interactive multimedia tour guide recited in claim 1, further comprising means for accessing an Internet Web site and updating information for a selected tour from the Internet Web site.

3. The interactive multimedia tour guide recited in claim 2, wherein the means for accessing an Internet Web site accesses Web sites, if any, of at least principle points of interest in the selected tour.

4. The interactive multimedia tour guide recited in claim 2, wherein the means for accessing an Internet Web site accesses a Web site of a provider of the GIS database.

5. The interactive multimedia tour guide recited in claim 1, further comprising a user preference mask applied to a selected tour to select those ancillary points of interest in the selected tour which may be of the most interest to a user to generate a customized tour for the user.

6. The interactive multimedia tour guide recited in claim 1, further comprising means for previewing one or more packaged tours in the GIS database, a preview of a packaged tour including an audio/visual presentation of at least the principle points of interest in a packaged tour.

7. The interactive multimedia tour guide recited in claim 6, further comprising selection means allowing a user to select principle points of interest from two or more packaged tours to generate a custom tour.

8. The interactive multimedia tour guide recited in claim 6, further comprising a user preference mask applied to a selected tour to select those ancillary points of interest in the selected tour which may be of most interest to a user to generate a customized tour for the user.

9. The interactive multimedia tour guide recited in claim 1, further comprising:
   a user preference mask and a travel companion preference mask;

a combining function for combining the user preference mask and the travel companion preference mask to generate a composite preference mask; and means for applying the composite preference mask to a selected tour to select those ancillary points of interest in the selected tour which may be of the most interest to a user and travel companion to generate a customized tour for the user and travel companion.

10. The interactive multimedia tour guide recited in claim 1, further comprising a camera interfacing with the portable self-contained system, the camera including means for generating orientation information and obtaining location information, the camera date and time stamping images and providing orientation and location information for images, the orientation and location information being used to access related information from the GIS database to identify a probable subject of an image.

11. The interactive multimedia tour guide recited in claim 10, further comprising means prompting a user to confirm an identified probable subject of an image.

12. The interactive multimedia tour guide recited in claim 11, wherein the user is prompted to identify the image if the identified probable subject of the image is not confirmed.

13. The interactive multimedia tour guide recited in claim 1, wherein the portable self-contained system further includes a portable telephone operable in response to voice commands.

14. The interactive multimedia tour guide recited in claim 13, wherein related information from the GIS database includes Universal Resource Locators (URLs) for at least the principle points of interest of a selected tour, the portable self-contained system prompting a user on approach to a point of interest as determined from location information generated by the GPS receiver whether to access an Internet Web site of the point of interest and, if the user enters a command to access the Web site, accessing the Web site using the portable telephone.

15. The interactive multimedia tour guide recited in claim 1, further comprising a voice recognition function which responds to voiced commands from the user.

16. The interactive multimedia tour guide recited in claim 15, wherein the related information from the GIS database includes amenities, the voice recognition function responding to a voiced command from a user to locate a place to eat by searching the amenities included in the related information to identify proximate places to eat.

17. The interactive multimedia tour guide recited in claim 15, wherein the related information from the GIS database includes amenities, the voice recognition function responding to a voiced command from a user to locate a place to stay by searching the amenities included in the related information to identify proximate places to stay.

18. A portable self-contained interactive multimedia tour guide comprising:

means for storing at least a selected tour from a Geographic Information System (GIS) database of packaged tours, the selected tour being comprised of principle points of interest and ancillary points of interest, the ancillary points of interest not being the primary subject of the selected tour;

a Global Positioning Satellite (GPS) receiver generating location information;

a central processing unit (CPU) receiving said location information and accessing said GIS database;

a display controlled by the CPU to display a map showing a current location relative to the selected tour, and a speech synthesis function controlled by The CPU to provide audible directions and information about points of interest as the selected tour progresses and audible prompts to a user, wherein the CPU is programmed to allow the user to modify the selected tour while in progress.

19. The portable self-contained interactive multimedia tour guide recited in claim 18, further comprising a portable telephone.

20. The portable self-contained interactive multimedia tour guide recited in claim 19, wherein the portable telephone includes an integrated Personal Digital Assistant (PDA) and the tour guide and portable telephone are housed in a unitary structure.

21. The portable self-contained interactive multimedia tour guide recited in claim 20, further comprising a camera attachment for attaching to said unitary structure, the display serving as a view finder for the camera attachment when attached to the unitary structure.

22. The portable self-contained interactive multimedia tour guide recited in claim 21, wherein the camera attachment includes means for generating orientation information, the CPU using the orientation information from the camera attachment and location information from the GPS system for images taken by the camera attachment to access related information from the GIS database to identify a probable subject of an image.

23. The portable self-contained interactive multimedia tour guide recited in claim 22, further comprising means prompting a user to confirm an identified probable subject of an image.

24. The portable self-contained interactive multimedia tour guide recited in claim 23, wherein the user is prompted to identify the image if the identified probable subject of the image is not confirmed.

25. The portable self-contained interactive multimedia tour guide recited in claim 19, wherein related information from the GIS database includes Universal Resource Locators (URLs) for at least principle points of interest of a selected tour, the portable self-contained multimedia tour guide prompting a user on approach to a point of interest as determined from location information generated by the GPS receiver whether to access an Internet Web site of the point of interest and, if the user enters a command to access the Web site, accessing the Web site using the portable telephone.

26. The portable self-contained interactive multimedia tour guide recited in claim 18, further comprising a voice recognition function which responds to voiced commands from the user.

27. The interactive multimedia tour guide recited in claim 26, wherein the related information from the GIS database includes amenities, the tour guide responds to a voiced command from a user to locate a place to eat by searching the amenities included in the related information to identify proximate places to eat.

28. The interactive multimedia tour guide recited in claim 26, wherein the related information from the GIS database includes amenities, the tour guide responds to a voiced command from a user to locate a place to stay by searching the amenities included in the related information to identify proximate places to stay.

29. A method of providing tours for use in an interactive multimedia tour guide comprising the steps of:

generating a Geographical Information System (GIS) database containing packaged tours tom which a user may select a tour, each tour being comprised of principle points of interest and ancillary points of interest, the ancillary points of interest not being the pi subject of the selected tour, prompting a user to preview one or more packaged tours in the GIS database, a preview of a packaged tour including an audio/visual presentation of at least the principle points of interest in a packaged tour, and allowing a user to select principle points of interest from two or more packaged tours to generate a custom tour.

30. The method of providing tours for use in an interactive multimedia tour guide recited in claim 29, further comprising the steps of:

generating a preference mask for the user; and applying the preference mask to a selected tour to select those ancillary points of interest in the selected tour which may be of the most interest to a user to generate a customized tour for the user.

31. The method of providing tours for use in an interactive multimedia tour guide recited in claim 29, further comprising the steps of:

generating preference masks for the user and a travel companion;

combining the preference masks of the user and the travel companion using a combining function to generate a composite preference mask; and applying the composite preference mask to a selected tour to select those ancillary points of interest in the selected tour which may be of the most interest to the user and the travel companion to generate a customized tour.

32. The method of providing tours for use in an interactive multimedia tour guide recited in claim 29, further comprising the steps of:

accessing a Web site; and updating information for the selected tour from the Web site.

33. The method of providing tours for use in an interactive multimedia tour guide recited in claim 32, wherein the step of accessing a Web site includes accessing Web sites, if any, of at least the principle points of interest in a selected tour.

34. The method of providing tours for use in an interactive multimedia tour guide recited in claim 32, wherein the step of accessing a Web site includes accessing a Web site of a provider of the GIS database.

35. The method of providing tours for use in an interactive multimedia tour guide recited in claim 29, wherein the GIS database is Global Positioning Satellite (GPS) enabled and further comprising the steps of:

accessing information for the selected tour in the GIS database using GPS generated location information;

providing audible directions and information about points of interest as the tour progresses; and allowing the user to modify the selected tour while in progress.

36. The method of providing tours for use in an interactive multimedia tour guide recited in claim 35, further comprising the steps of receiving orientation and location information from a camera;

accessing information for the selected tour in the GIS database using the orientation and location information from the camera; and determining a probable subject of an image.

37. The method of providing tours for use in an interactive multimedia tour guide recited in claim 36, further comprising the step of prompting a user to confirm an identified probable subject of an image.

38. The method of providing tours for use in an interactive multimedia tour guide recited in claim 37, further comprising the step of prompting the user to identify the image if the identified probable subject of the image is not confirmed.

39. The method of providing tours for use in an interactive multimedia tour guide recited in claim 35, wherein the information for the selected tour in the GIS database includes amenities and further comprising the steps of:

responding to a voiced command for food or lodging by accessing the amenities information for the selected tour in the GIS database using GPS generated location information; and providing information on locations of places where food or lodging may be obtained.

40. A camera comprising:

means for recording an image, a Global Positioning Satellite (GPS) receiver for generating location information at a time when the image is recorded;

a digital compass for generating orientation information at the time when the image is recorded;

a Geographic Information System (GIS) database storing points of interest; and database search means for searching the GIS database using said location and orientation information generated at the time when the image is recorded to identify a probable subject of the image.

41. The camera recited in claim 40, further comprising means prompting a user to confirm an identified probable subject of an image.

42. The camera recited in claim 41, wherein the user is prompted to identify the image if the identified probable subject of the image is not confirmed.

* * * * *